(12) United States Patent
Boutros et al.

(10) Patent No.: US 12,341,680 B2
(45) Date of Patent: *Jun. 24, 2025

(54) SERVICE OPERATION CHAINING

(71) Applicant: VMware LLC, Palo Alto, CA (US)

(72) Inventors: Sami Boutros, Union City, CA (US);
Pere Monclus, Union City, CA (US);
Philip Kippen, Fall City, WA (US);
Dharma Rajan, North Miami Beach, FL (US); Yashika Narang, Fall City, WA (US)

(73) Assignee: VMWare LLC, Palo Alto, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/227,303

(22) Filed: Jul. 28, 2023

(65) Prior Publication Data
US 2023/0388200 A1    Nov. 30, 2023

Related U.S. Application Data

(63) Continuation of application No. 17/067,635, filed on Oct. 9, 2020, now Pat. No. 11,750,476, which is a
(Continued)

(51) Int. Cl.
*H04L 45/00* (2022.01)
*H04L 12/46* (2006.01)
(Continued)

(52) U.S. Cl.
CPC .......... *H04L 43/20* (2022.05); *H04L 12/4633* (2013.01); *H04L 41/5041* (2013.01);
(Continued)

(58) Field of Classification Search
None
See application file for complete search history.

(56) References Cited

U.S. PATENT DOCUMENTS

| 6,006,264 A | 12/1999 | Colby et al. |
| 6,104,700 A | 8/2000 | Haddock et al. |
| (Continued) | | |

FOREIGN PATENT DOCUMENTS

| CA | 3034809 A1 | 3/2018 |
| CN | 1689369 A | 10/2005 |
| (Continued) | | |

OTHER PUBLICATIONS

Internet draft "Geneve: Generic Network Virtualization Encapsulation" draft-ietf-nvo3-geneve-04 (date: Mar. 13, 2017) to Gross et al. ("Gross"). (Year: 2017).*

(Continued)

*Primary Examiner* — June Sison
(74) *Attorney, Agent, or Firm* — Quarles & Brady LLP

(57) ABSTRACT

For a multi-tenant environment, some embodiments of the invention provide a novel method for forwarding tenant traffic through a set of service machines to perform a set of service operations on the tenant traffic. In some embodiments, the method performs a classification operation on a data message flow of a tenant, in order to identify a set of service operations to perform on the data message flow. For some data message flows, the classification operation selects the identified set of service operations from several candidate sets of service operations that are viable service operation sets for similar data message flows of the tenant. In some embodiments, the classification operation is based on a set of attributes associated with the data message flow (e.g., five tuple identifier, i.e., protocol and source and destination ports and IP addresses).

16 Claims, 11 Drawing Sheets

Related U.S. Application Data continuation of application No. 15/881,670, filed on Jan. 26, 2018, now Pat. No. 10,805,181.

(60) Provisional application No. 62/578,507, filed on Oct. 29, 2017.

(51) Int. Cl.
*H04L 41/5041* (2022.01)
*H04L 43/028* (2022.01)
*H04L 43/20* (2022.01)
*H04L 47/2408* (2022.01)
*H04L 47/2483* (2022.01)
*H04L 67/1014* (2022.01)
*H04L 67/567* (2022.01)
*G06F 9/455* (2018.01)
*H04L 9/40* (2022.01)
*H04L 45/76* (2022.01)
*H04L 67/10* (2022.01)
*H04L 69/22* (2022.01)

(52) U.S. Cl.
CPC ............ *H04L 43/028* (2013.01); *H04L 45/00* (2013.01); *H04L 47/2408* (2013.01); *H04L 47/2483* (2013.01); *H04L 67/1014* (2013.01); *H04L 67/567* (2022.05); *G06F 2009/45595* (2013.01); *H04L 45/76* (2022.05); *H04L 63/0209* (2013.01); *H04L 63/123* (2013.01); *H04L 67/10* (2013.01); *H04L 69/22* (2013.01); *H04L 2212/00* (2013.01)

(56) References Cited

U.S. PATENT DOCUMENTS

| | | |
|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,499,463 B1 | 3/2009 | Droux et al. |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,921,174 B1 | 4/2011 | Denise |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,224,885 B1 | 7/2012 | Doucette et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 | 12/2013 | Ramamoorthi et al. |
| 8,707,383 B2 | 4/2014 | Bade et al. |
| 8,738,702 B1 | 5/2014 | Belanger et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 | 9/2014 | Sharma et al. |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 | 10/2014 | Cherukuri et al. |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Augsnes et al. |
| 8,966,024 B2 | 2/2015 | Koponen et al. |
| 8,966,029 B2 | 2/2015 | Zhang et al. |
| 8,971,345 B1 | 3/2015 | McCanne et al. |
| 8,989,192 B2 | 3/2015 | Foo et al. |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,178,709 B2 | 11/2015 | Higashida et al. |
| 9,191,293 B2 | 11/2015 | Tovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 | 12/2015 | McCanne et al. |
| 9,232,342 B2 | 1/2016 | Seed et al. |
| 9,237,098 B2 | 1/2016 | Patel et al. |
| 9,256,467 B1 | 2/2016 | Singh et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,344,337 B2 | 5/2016 | Kumar et al. |
| 9,363,183 B2 | 6/2016 | Kumar et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,442,752 B1 | 9/2016 | Roth et al. |
| 9,467,382 B2 | 10/2016 | Kumar et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,608,896 B2 | 3/2017 | Kumar et al. |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,559 B1 | 10/2017 | Schroeder |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 9,996,380 B2 | 6/2018 | Singh et al. |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |

(56) References Cited

U.S. PATENT DOCUMENTS

| | | |
|---|---|---|
| 10,129,180 B2 | 11/2018 | Zhang et al. |
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,305,822 B2 | 5/2019 | Tao et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,390,285 B2 | 8/2019 | Zhou |
| 10,397,275 B2 | 8/2019 | Jain et al. |
| 10,445,509 B2 | 10/2019 | Thota et al. |
| 10,484,334 B1 | 11/2019 | Lee et al. |
| 10,514,941 B2 | 12/2019 | Zhang et al. |
| 10,516,568 B2 | 12/2019 | Jain et al. |
| 10,547,508 B1 | 1/2020 | Kanakarajan |
| 10,547,692 B2 | 1/2020 | Salgueiro et al. |
| 10,554,484 B2 | 2/2020 | Chanda et al. |
| 10,594,743 B2 | 3/2020 | Hong et al. |
| 10,609,091 B2 | 3/2020 | Hong et al. |
| 10,609,122 B1 | 3/2020 | Argenti et al. |
| 10,623,309 B1 | 4/2020 | Gampel et al. |
| 10,637,750 B1 | 4/2020 | Bollineni et al. |
| 10,645,060 B2 | 5/2020 | Ao et al. |
| 10,645,201 B2 | 5/2020 | Mishra et al. |
| 10,659,252 B2 | 5/2020 | Boutros et al. |
| 10,693,782 B2 | 6/2020 | Jain et al. |
| 10,700,891 B2 | 6/2020 | Hao et al. |
| 10,708,229 B2 | 7/2020 | Sevinc et al. |
| 10,728,174 B2 | 7/2020 | Boutros et al. |
| 10,735,311 B2 | 8/2020 | Li |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,802,858 B2 | 10/2020 | Gunda |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,826,835 B2 | 11/2020 | Ruckstuhl et al. |
| 10,834,004 B2 | 11/2020 | Yigit et al. |
| 10,853,111 B1 | 12/2020 | Gupta et al. |
| 10,929,171 B2 | 2/2021 | Gokhale et al. |
| 10,931,793 B2 | 2/2021 | Kumar et al. |
| 10,938,668 B1 | 3/2021 | Zulak et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 10,997,177 B1 | 5/2021 | Howes et al. |
| 11,003,482 B2 | 5/2021 | Rolando et al. |
| 11,012,351 B2 | 5/2021 | Feng et al. |
| 11,012,420 B2 | 5/2021 | Sevinc et al. |
| 11,026,047 B2 | 6/2021 | Greenberger et al. |
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,055,273 B1 | 7/2021 | Meduri et al. |
| 11,074,097 B2 | 7/2021 | Naveen et al. |
| 11,075,839 B2 | 7/2021 | Zhuang et al. |
| 11,075,842 B2 | 7/2021 | Jain et al. |
| 11,086,654 B2 | 8/2021 | Rolando et al. |
| 11,119,804 B2 | 9/2021 | Gokhale et al. |
| 11,140,218 B2 | 10/2021 | Tidemann et al. |
| 11,153,190 B1 | 10/2021 | Mahajan et al. |
| 11,153,406 B2 | 10/2021 | Sawant et al. |
| 11,157,304 B2 | 10/2021 | Watt, Jr. et al. |
| 11,184,397 B2 | 11/2021 | Annadata et al. |
| 11,194,610 B2 | 12/2021 | Mundaragi et al. |
| 11,212,356 B2 | 12/2021 | Rolando et al. |
| 11,223,494 B2 | 1/2022 | Mishra et al. |
| 11,249,784 B2 | 2/2022 | Chalvadi et al. |
| 11,265,187 B2 | 3/2022 | Boutros et al. |
| 11,277,331 B2 | 3/2022 | Rolando et al. |
| 11,283,717 B2 | 3/2022 | Tidemann et al. |
| 11,288,088 B2 | 3/2022 | Rolando et al. |
| 11,294,703 B2 | 4/2022 | Rolando et al. |
| 11,296,930 B2 | 4/2022 | Jain et al. |
| 11,301,281 B2 | 4/2022 | Rolando et al. |
| 11,316,900 B1 | 4/2022 | Schottland et al. |
| 11,321,113 B2 | 5/2022 | Feng et al. |
| 11,354,148 B2 | 6/2022 | Rolando et al. |
| 11,360,796 B2 | 6/2022 | Mishra et al. |
| 11,368,387 B2 | 6/2022 | Rolando et al. |
| 11,397,604 B2 | 7/2022 | Mundaragi et al. |
| 11,398,983 B2 | 7/2022 | Wijnands et al. |
| 11,405,431 B2 | 8/2022 | Hong et al. |
| 11,411,863 B2 | 8/2022 | Zhang et al. |
| 11,438,257 B2 | 9/2022 | Rolando et al. |
| 11,438,267 B2 | 9/2022 | Jain et al. |
| 11,467,861 B2 | 10/2022 | Kavathia et al. |
| 11,496,606 B2 | 11/2022 | Jain et al. |
| 11,528,213 B2 | 12/2022 | Venkatasubbaiah et al. |
| 11,528,219 B2 | 12/2022 | Rolando et al. |
| 11,595,250 B2 | 2/2023 | Naveen et al. |
| 11,604,666 B2 | 3/2023 | Feng et al. |
| 11,609,781 B2 | 3/2023 | Mishra et al. |
| 11,611,625 B2 | 3/2023 | Jain et al. |
| 11,659,061 B2 | 5/2023 | Sawant et al. |
| 11,722,367 B2 | 8/2023 | Jain et al. |
| 11,722,559 B2 | 8/2023 | Tidemann et al. |
| 2002/0010783 A1 | 1/2002 | Primak et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0188026 A1 | 10/2003 | Denton et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2004/0249776 A1 | 12/2004 | Horvitz et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0153782 A1 | 7/2007 | Fletcher et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |

(56) References Cited

U.S. PATENT DOCUMENTS

| | | |
|---|---|---|
| 2008/0104608 A1 | 5/2008 | Hyser et al. |
| 2008/0195755 A1 | 8/2008 | Lu et al. |
| 2008/0225714 A1 | 9/2008 | Denis |
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0190506 A1 | 7/2009 | Belling et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1 | 4/2010 | Bryson et al. |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0254385 A1 | 10/2010 | Sharma et al. |
| 2010/0257278 A1 | 10/2010 | Gunturu |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1 | 12/2011 | Clark |
| 2012/0005265 A1 | 1/2012 | Ushioda et al. |
| 2012/0011281 A1 | 1/2012 | Hamada et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0110577 A1 | 5/2012 | Chen et al. |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0266252 A1 | 10/2012 | Spiers et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0287036 A1 | 10/2013 | Banavalikar et al. |
| 2013/0291088 A1 | 10/2013 | Shieh et al. |
| 2013/0297798 A1 | 11/2013 | Arisoylu et al. |
| 2013/0301472 A1 | 11/2013 | Allan |
| 2013/0311637 A1 | 11/2013 | Kamath et al. |
| 2013/0311778 A1* | 11/2013 | Cherukuri ............ H04L 67/1001 713/171 |
| 2013/0318219 A1 | 11/2013 | Kancherla |
| 2013/0322446 A1 | 12/2013 | Biswas et al. |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0050223 A1 | 2/2014 | Foo et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0108665 A1 | 4/2014 | Arora et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0254591 A1 | 9/2014 | Mahadevan et al. |
| 2014/0269487 A1 | 9/2014 | Kalkunte |

(56) References Cited

U.S. PATENT DOCUMENTS

| | | |
|---|---|---|
| 2014/0269717 A1 | 9/2014 | Thubert et al. |
| 2014/0269724 A1 | 9/2014 | Mehler et al. |
| 2014/0280896 A1 | 9/2014 | Papakostas et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson, III et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0341029 A1 | 11/2014 | Allan et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071285 A1 | 3/2015 | Kumar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092551 A1 | 4/2015 | Moisand et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0106802 A1 | 4/2015 | Ivanov et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124815 A1 | 5/2015 | Beliveau et al. |
| 2015/0124829 A1 | 5/2015 | Koodli et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1 | 6/2015 | Foo et al. |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0244617 A1 | 8/2015 | Nakil et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0319078 A1 | 11/2015 | Lee et al. |
| 2015/0319096 A1 | 11/2015 | Yip et al. |
| 2015/0358235 A1 | 12/2015 | Zhang et al. |
| 2015/0358294 A1 | 12/2015 | Kancharla et al. |
| 2015/0365322 A1 | 12/2015 | Shatzkamer et al. |
| 2015/0370586 A1 | 12/2015 | Cooper et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0379277 A1 | 12/2015 | Thota et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0043952 A1 | 2/2016 | Zhang et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0099948 A1 | 4/2016 | Ott et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0134531 A1* | 5/2016 | Assarpour ............... H04L 45/38 370/392 |
| 2016/0149784 A1 | 5/2016 | Zhang et al. |
| 2016/0149816 A1 | 5/2016 | Roach et al. |
| 2016/0149828 A1 | 5/2016 | Vijayan et al. |
| 2016/0162320 A1 | 6/2016 | Singh et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197831 A1 | 7/2016 | Foy et al. |
| 2016/0197839 A1 | 7/2016 | Li et al. |
| 2016/0203817 A1 | 7/2016 | Formhals et al. |
| 2016/0205015 A1 | 7/2016 | Halligan et al. |
| 2016/0212048 A1 | 7/2016 | Kaempfer et al. |
| 2016/0212237 A1 | 7/2016 | Nishijima |
| 2016/0218918 A1 | 7/2016 | Chu et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0232019 A1 | 8/2016 | Shah et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0337317 A1 | 11/2016 | Hwang et al. |
| 2016/0344565 A1 | 11/2016 | Batz et al. |
| 2016/0344621 A1 | 11/2016 | Roeland et al. |

(56) References Cited

U.S. PATENT DOCUMENTS

| | | |
|---|---|---|
| 2016/0344803 A1 | 11/2016 | Batz et al. |
| 2016/0352866 A1 | 12/2016 | Gupta et al. |
| 2016/0366046 A1 | 12/2016 | Anantharam et al. |
| 2016/0373364 A1 | 12/2016 | Yokota |
| 2016/0378537 A1 | 12/2016 | Zou |
| 2016/0380812 A1 | 12/2016 | Chanda et al. |
| 2017/0005882 A1 | 1/2017 | Tao et al. |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019303 A1 | 1/2017 | Swamy et al. |
| 2017/0019329 A1 | 1/2017 | Kozat et al. |
| 2017/0019331 A1 | 1/2017 | Yong |
| 2017/0019341 A1 | 1/2017 | Huang et al. |
| 2017/0026417 A1 | 1/2017 | Ermagan et al. |
| 2017/0033939 A1 | 2/2017 | Bragg et al. |
| 2017/0063683 A1 | 3/2017 | Li et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0093758 A1 | 3/2017 | Chanda |
| 2017/0099194 A1 | 4/2017 | Wei |
| 2017/0126497 A1 | 5/2017 | Dubey et al. |
| 2017/0126522 A1 | 5/2017 | McCann et al. |
| 2017/0126726 A1 | 5/2017 | Han |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0149680 A1 | 5/2017 | Liu et al. |
| 2017/0163531 A1 | 6/2017 | Kumar et al. |
| 2017/0163724 A1 | 6/2017 | Puri et al. |
| 2017/0170990 A1 | 6/2017 | Gaddehosur et al. |
| 2017/0171159 A1 | 6/2017 | Kumar et al. |
| 2017/0180240 A1 | 6/2017 | Kern et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0220306 A1 | 8/2017 | Price et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250869 A1 | 8/2017 | Voelmy |
| 2017/0250902 A1 | 8/2017 | Rasanen et al. |
| 2017/0250917 A1 | 8/2017 | Ruckstuhl et al. |
| 2017/0251065 A1 | 8/2017 | Furr et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295033 A1 | 10/2017 | Cherian et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317936 A1 | 11/2017 | Swaminathan et al. |
| 2017/0317954 A1 | 11/2017 | Masurekar et al. |
| 2017/0317969 A1 | 11/2017 | Masurekar et al. |
| 2017/0318081 A1 | 11/2017 | Hopen et al. |
| 2017/0318097 A1 | 11/2017 | Drew et al. |
| 2017/0324651 A1 | 11/2017 | Penno et al. |
| 2017/0324654 A1 | 11/2017 | Previdi et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0359252 A1 | 12/2017 | Kumar et al. |
| 2017/0364287 A1 | 12/2017 | Antony et al. |
| 2017/0364794 A1 | 12/2017 | Mahkonen et al. |
| 2017/0366605 A1 | 12/2017 | Chang et al. |
| 2017/0373990 A1 | 12/2017 | Jeuk et al. |
| 2018/0004954 A1 | 1/2018 | Liguori et al. |
| 2018/0006935 A1 | 1/2018 | Mutnuru et al. |
| 2018/0026911 A1 | 1/2018 | Anholt et al. |
| 2018/0027101 A1 | 1/2018 | Kumar et al. |
| 2018/0041425 A1 | 2/2018 | Zhang |
| 2018/0041470 A1 | 2/2018 | Schultz et al. |
| 2018/0041524 A1 | 2/2018 | Reddy et al. |
| 2018/0063000 A1 | 3/2018 | Wu et al. |
| 2018/0063018 A1 | 3/2018 | Bosch et al. |
| 2018/0063087 A1 | 3/2018 | Hira et al. |
| 2018/0091420 A1 | 3/2018 | Drake et al. |
| 2018/0102919 A1 | 4/2018 | Hao et al. |
| 2018/0102965 A1 | 4/2018 | Hari et al. |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa et al. |
| 2018/0191600 A1 | 7/2018 | Hecker et al. |
| 2018/0198692 A1 | 7/2018 | Ansari et al. |
| 2018/0198705 A1* | 7/2018 | Wang .................... H04L 45/50 |
| 2018/0198791 A1 | 7/2018 | Desai et al. |
| 2018/0203736 A1 | 7/2018 | Vyas et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0247082 A1 | 8/2018 | Durham et al. |
| 2018/0248713 A1 | 8/2018 | Zanier et al. |
| 2018/0248755 A1 | 8/2018 | Hecker et al. |
| 2018/0248790 A1 | 8/2018 | Tan et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0288129 A1 | 10/2018 | Joshi et al. |
| 2018/0295036 A1 | 10/2018 | Krishnamurthy et al. |
| 2018/0295053 A1 | 10/2018 | Leung et al. |
| 2018/0302242 A1 | 10/2018 | Hao et al. |
| 2018/0309632 A1 | 10/2018 | Kompella et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2018/0375684 A1 | 12/2018 | Filsfils et al. |
| 2019/0007382 A1 | 1/2019 | Nirwal et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028347 A1 | 1/2019 | Johnston et al. |
| 2019/0028384 A1 | 1/2019 | Penno et al. |
| 2019/0028577 A1 | 1/2019 | D'Souza et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0102280 A1 | 4/2019 | Caldato et al. |
| 2019/0108049 A1 | 4/2019 | Singh et al. |
| 2019/0116063 A1 | 4/2019 | Bottorff et al. |
| 2019/0121961 A1 | 4/2019 | Coleman et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140863 A1 | 5/2019 | Nainar et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |

(56) References Cited

U.S. PATENT DOCUMENTS

| | | |
|---|---|---|
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |
| 2019/0173850 A1 | 6/2019 | Jain et al. |
| 2019/0173851 A1 | 6/2019 | Jain et al. |
| 2019/0222538 A1 | 7/2019 | Yang et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0268384 A1 | 8/2019 | Hu et al. |
| 2019/0286475 A1 | 9/2019 | Mani |
| 2019/0288915 A1 | 9/2019 | Denyer et al. |
| 2019/0288946 A1 | 9/2019 | Gupta et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0377604 A1 | 12/2019 | Cybulski |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0073739 A1 | 3/2020 | Rungta et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0084147 A1 | 3/2020 | Gandhi et al. |
| 2020/0136960 A1 | 4/2020 | Jeuk et al. |
| 2020/0143388 A1 | 5/2020 | Duchin et al. |
| 2020/0145331 A1 | 5/2020 | Bhandari et al. |
| 2020/0162318 A1 | 5/2020 | Patil et al. |
| 2020/0162352 A1 | 5/2020 | Jorgenson et al. |
| 2020/0183724 A1 | 6/2020 | Shevade et al. |
| 2020/0195711 A1 | 6/2020 | Abhigyan et al. |
| 2020/0204492 A1 | 6/2020 | Sarva et al. |
| 2020/0213366 A1 | 7/2020 | Hong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274801 A1 | 8/2020 | Feng et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0287962 A1 | 9/2020 | Mishra et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0364074 A1 | 11/2020 | Gunda et al. |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2020/0389401 A1 | 12/2020 | Enguehard et al. |
| 2021/0004245 A1 | 1/2021 | Kamath et al. |
| 2021/0011812 A1 | 1/2021 | Mitkar et al. |
| 2021/0011816 A1 | 1/2021 | Mitkar et al. |
| 2021/0029088 A1 | 1/2021 | Mayya et al. |
| 2021/0044502 A1 | 2/2021 | Boutros et al. |
| 2021/0067439 A1 | 3/2021 | Kommula et al. |
| 2021/0073736 A1 | 3/2021 | Alawi et al. |
| 2021/0117217 A1 | 4/2021 | Croteau et al. |
| 2021/0120080 A1 | 4/2021 | Mishra et al. |
| 2021/0135992 A1 | 5/2021 | Tidemann et al. |
| 2021/0136140 A1 | 5/2021 | Tidemann et al. |
| 2021/0136141 A1 | 5/2021 | Tidemann et al. |
| 2021/0136147 A1 | 5/2021 | Giassa et al. |
| 2021/0218587 A1 | 7/2021 | Mishra et al. |
| 2021/0227041 A1 | 7/2021 | Sawant et al. |
| 2021/0227042 A1 | 7/2021 | Sawant et al. |
| 2021/0240734 A1 | 8/2021 | Shah et al. |
| 2021/0266295 A1 | 8/2021 | Stroz |
| 2021/0271565 A1 | 9/2021 | Bhavanarushi et al. |
| 2021/0306240 A1 | 9/2021 | Boutros et al. |
| 2021/0311758 A1 | 10/2021 | Cao et al. |
| 2021/0311772 A1 | 10/2021 | Mishra et al. |
| 2021/0314248 A1 | 10/2021 | Rolando et al. |
| 2021/0314252 A1 | 10/2021 | Rolando et al. |
| 2021/0314253 A1 | 10/2021 | Rolando et al. |
| 2021/0314268 A1 | 10/2021 | Rolando et al. |
| 2021/0314277 A1 | 10/2021 | Rolando et al. |
| 2021/0314310 A1 | 10/2021 | Cao et al. |
| 2021/0314415 A1 | 10/2021 | Rolando et al. |
| 2021/0314423 A1 | 10/2021 | Rolando et al. |
| 2021/0328913 A1 | 10/2021 | Nainar et al. |
| 2021/0349767 A1 | 11/2021 | Asayag et al. |
| 2021/0359945 A1 | 11/2021 | Jain et al. |
| 2021/0377160 A1 | 12/2021 | Faseela |
| 2022/0019698 A1 | 1/2022 | Durham et al. |
| 2022/0030058 A1 | 1/2022 | Tidemann et al. |
| 2022/0038310 A1 | 2/2022 | Boutros et al. |
| 2022/0060467 A1 | 2/2022 | Montgomery et al. |
| 2022/0078037 A1 | 3/2022 | Mishra et al. |
| 2022/0188140 A1 | 6/2022 | Jain et al. |
| 2022/0191304 A1 | 6/2022 | Jain et al. |
| 2022/0417150 A1 | 12/2022 | Jain et al. |
| 2023/0052818 A1 | 2/2023 | Jain et al. |
| 2023/0168917 A1 | 6/2023 | Kavathia et al. |
| 2023/0179474 A1 | 6/2023 | Naveen et al. |

FOREIGN PATENT DOCUMENTS

| | | |
|---|---|---|
| CN | 101594358 A | 12/2009 |
| CN | 101729412 A | 6/2010 |
| CN | 103516807 A | 1/2014 |
| CN | 103795805 A | 5/2014 |
| CN | 104471899 A | 3/2015 |
| CN | 104521195 A | 4/2015 |
| CN | 106134137 A | 11/2016 |
| CN | 107005584 A | 8/2017 |
| CN | 107078950 A | 8/2017 |
| CN | 107113208 A | 8/2017 |
| CN | 107204941 A | 9/2017 |
| CN | 107210959 A | 9/2017 |
| CN | 109213573 A | 1/2019 |
| CN | 110521169 A | 11/2019 |
| CN | 107105061 B | 9/2020 |
| CN | 112181632 A | 1/2021 |
| EP | 2426956 A1 | 3/2012 |
| EP | 2466985 A1 | 6/2012 |
| EP | 3210345 A1 | 8/2017 |
| EP | 3300319 A1 | 3/2018 |
| EP | 3662644 A1 | 6/2020 |
| JP | 2005311863 A | 11/2005 |
| JP | 2015519822 A | 7/2015 |
| WO | 9918534 A2 | 4/1999 |
| WO | 2008095010 A1 | 8/2008 |
| WO | 2014069978 A1 | 5/2014 |
| WO | 2014182529 A1 | 11/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2019157955 A1 | 8/2019 |
| WO | 2019168532 A1 | 9/2019 |
| WO | 2019226327 A1 | 11/2019 |

(56) References Cited

FOREIGN PATENT DOCUMENTS

| | | |
|---|---|---|
| WO | 2020046686 A1 | 3/2020 |
| WO | 2020171937 A1 | 8/2020 |
| WO | 2021041440 A1 | 3/2021 |
| WO | 2021086462 A1 | 5/2021 |
| WO | 2021206789 A1 | 10/2021 |
| WO | 2022132308 A1 | 6/2022 |

OTHER PUBLICATIONS

Author Unknown, "Datagram," Jun. 22, 2012, 2 pages, retrieved from https://web.archive.org/web/20120622031055/https://en.wikipedia.org/wiki/datagram.

Author Unknown, "MPLS," Mar. 3, 2008, 47 pages.

Author Unknown, "Reference Design: VMware NSX for vSphere (NSX), Network Virtualization Design Guide,", Aug. 21, 2014, 167 pages, VMware, Inc., Palo Alto, CA, retrieved from https://communities.vmware.com/docs/DOC-27683.

Author Unknown, "Research on Multi-tenancy Network Technology for Datacenter Network," May 2015, 64 pages, Beijing Jiaotong University.

Author Unknown, "Service Chaining in OpenStack with NSX," Dec. 28, 2016, 2 pages, retrieved from https://www.youtube.com/watch?v=xY1uz6PjWlo.

Author Unknown, "AppLogic Features," Jul. 2007, 2 pages, 3TERA, Inc.

Author Unknown, "Enabling Service Chaining on Cisco Nexus 1000V Series," Month Unknown, 2012, 25 pages, CISCO.

Casado, Martin, et al., "Virtualizing the Network Forwarding Plane," Dec. 2010, 6 pages.

Cianfrani, Antonio, et al., "Translating Traffic Engineering Outcome into Segment Routing Paths: the Encoding Problem," 2016 IEEE Conference on Computer Communications Workshops (INFOCOM Wkshps): GI 2016: 9th IEEE Global Internet Symposium, Apr. 10-14, 2016, 6 pages, IEEE, San Francisco, CA, USA.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., (U.S. Appl. No. 61/514,990), filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Halpern, J., et al., "Service Function Chaining (SFC) Architecture," RFC 7665, Oct. 2015, 32 pages, IETF Trust.

International Search Report and Written Opinion of Commonly Owned International Patent Application PCT/US2018/057184, mailed Feb. 12, 2019, 15 pages, International Searching Authority (EPO).

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QOS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Li, Qing-Gu, "Network Virtualization of Data Center Security," Information Security and Technology, Oct. 2012, 3 pages.

Lin, Po-Ching, et al., "Balanced Service Chaining in Software-Defined Networks with Network Function Virtualization," Computer: Research Feature, Nov. 2016, 9 pages, vol. 49, No. 11, IEEE.

Liu, W., et al., "Service Function Chaining (SFC) Use Cases," draft-liu-sfc-use-cases-02, Feb. 13, 2014, 17 pages, IETF.

Non-Published Commonly Owned U.S. Appl. No. 18/211,580, filed Jun. 19, 2023, 88 pages, Nicira, Inc.

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Siasi, N., et al., "Container-Based Service Function Chain Mapping," 2019 SoutheastCon, Apr. 11-14, 2019, 6 pages, IEEE, Huntsville, AL, USA.

Xiong, Gang, et al., "A Mechanism for Configurable Network Service Chaining and Its Implementation," KSII Transactions on Internet and Information Systems, Aug. 2016, 27 pages, vol. 10, No. 8, KSII.

\* cited by examiner

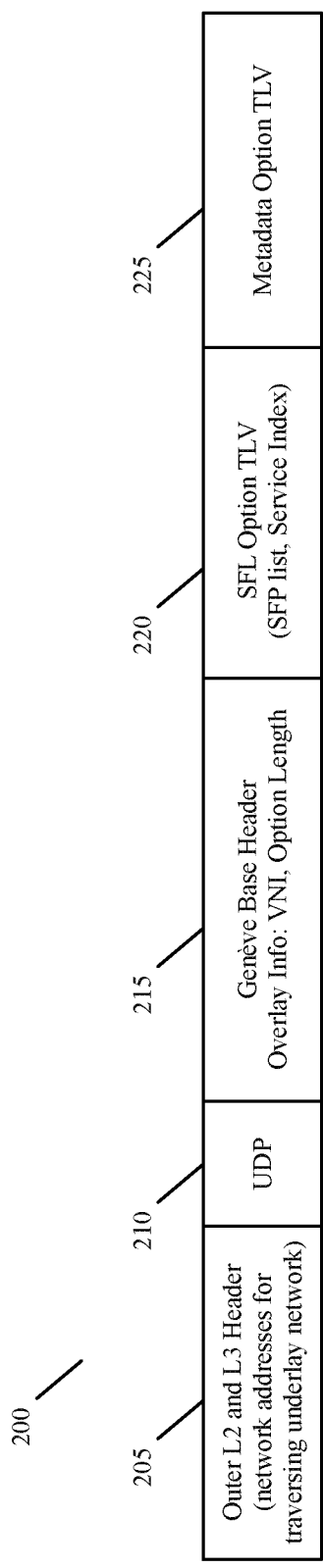
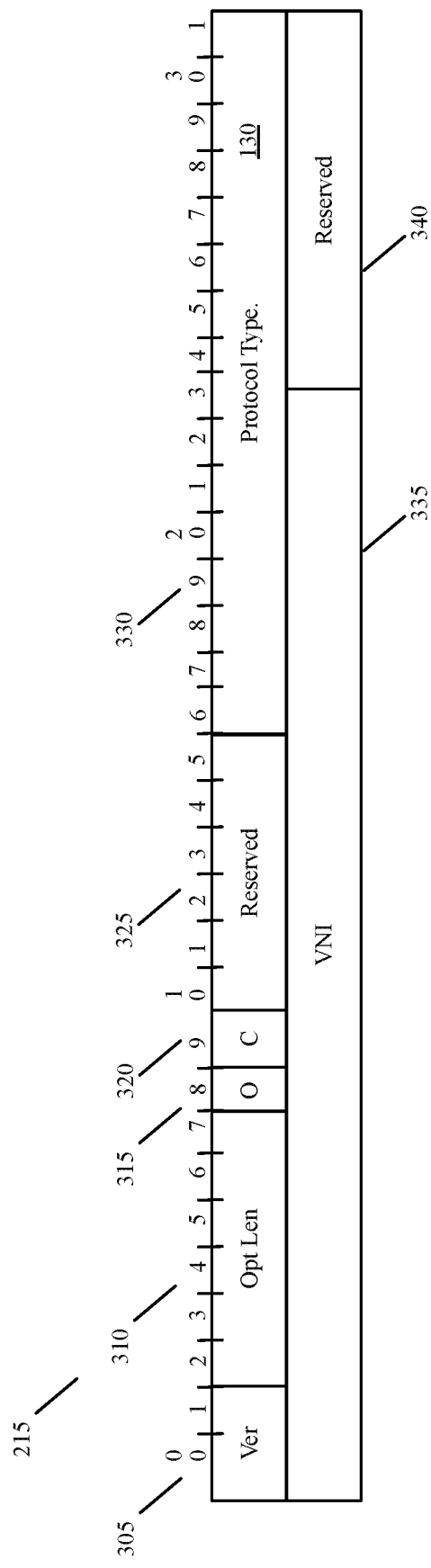

SERVICE OPERATION CHAINING

CLAIM OF BENEFIT TO PRIOR APPLICATIONS

This application is a continuation application of U.S. patent application Ser. No. 17/067,635, filed Oct. 9, 2020, now published as U.S. Patent Publication 2021/0044502. U.S. patent application Ser. No. 17/067,635 is a continuation application of U.S. patent application Ser. No. 15/881,670, filed Jan. 26, 2018, now issued as U.S. Pat. No. 10,805,181. U.S. patent application Ser. No. 15/881,670 claims the benefit of U.S. Provisional Patent Application 62/578,507, filed Oct. 29, 2017. U.S. patent application Ser. No. 15/881,670, now issued as U.S. Pat. No. 10,805,181, and U.S. patent application Ser. No. 17/067,635, now published as U.S. Patent Publication 2021/0044502 are incorporated herein by reference.

BACKGROUND

Middlebox services have historically been hardware appliances that are implemented at one or more points in a network topology in an enterprise or a datacenter. With the advent of software defined networking (SDN) and network virtualization, traditional hardware appliances do not take advantage of the flexibility and control that is provided by SDN and network virtualization. Accordingly, in recent years, some have suggested various ways to provide middlebox services on hosts. Some have also suggested accessing middlebox services in different clouds (e.g., different datacenters of different cloud providers). However, current service chaining solutions are not as robust as they should be to take advantage of the heterogeneous middlebox offerings today.

BRIEF SUMMARY

For a multi-tenant environment, some embodiments of the invention provide a novel method for forwarding tenant traffic through a set of service machines to perform a set of service operations on the tenant traffic. In some embodiments, the service machines can be standalone service appliances or computers, and/or service machines (e.g., virtual machines, containers, etc.) executing on host computers along with other service machines and/or tenant machines. Also, in some embodiments, one or more of the service machines are middlebox service machines that perform middlebox service operations, such as load balancing operations, firewall operations, intrusion detection operations, intrusion prevention operations, encryption/decryption operations, etc.

In some embodiments, the method performs a classification operation on a data message flow of a tenant, in order to identify a set of service operations to perform on the data message flow. For some data message flows, the classification operation selects the identified set of service operations from several candidate sets of service operations that are viable service operation sets for similar data message flows of the tenant. In some embodiments, the classification operation is based on a set of attributes associated with the data message flow (e.g., five tuple identifier, i.e., protocol and source and destination ports and IP addresses). This attribute set in some embodiments just includes the data message flow's layer 2-4 header values (e.g., five tuple identifier, i.e., protocol and source and destination ports and IP addresses). In other embodiments, however, the attribute set includes other contextual attributes related to the data message flow, such as the data message flow's traffic type (i.e., the type of content carried in the data message flow), QoS ratings, layer 7 parameters, process identifiers, user identifiers, group identifiers, etc.

In some embodiments, the service operations in the identified set of service operations have to be performed according to a particular sequence. To express the sequential nature of these service operations, the identified set of service operations is referred to below as the identified chain of service operations. After identifying the chain of service operations for the data message flow, the method in some embodiments embeds the identified chain of service operations in tunnel headers that it uses to encapsulate the flow's data messages. Also, in some embodiments, the method embeds in the tunnel headers a tenant identifier (e.g., embeds a VNI, virtual network identifier) to specify that the data messages are associated with a particular tenant (e.g., are emanating from a machine of the particular tenant). The method sends these encapsulated messages along a tunnel to a first service machine that performs a first service operation in the identified service chain.

The method in some embodiments identifies the service chain, and embeds this chain in the tunnel header, by identifying and embedding a set of network addresses (e.g., destination IP addresses) of a set of service machines that are to perform the service operations in the chain. In some embodiments, the method embeds in the tunnel header a service operation descriptor (e.g., tag) for each service machine identified in the tunnel header in order to explain the type of service operation that the service machine performs. In other embodiments, no such descriptor is embedded in the tunnel header. Also, the method in some embodiments embeds a service index value in the tunnel header that identifies one of the embedded network addresses as the network address of the "current" service operation. As further described below, this index is used in some embodiments to identify the next service machine for performing the next service operation in a service chain.

In some embodiments, the service machines addressed by the network addresses embedded in the tunnel communicatively connect to service nodes that are connected to each other through a set of tunnels. Service nodes can be different types of network elements in different embodiments. For instance, in some embodiments, the service nodes can be (1) host computers on which the service machines execute, (2) standalone forwarding elements connected to the service machines, or (3) service appliances that perform both the service node functionality (to connect to other service nodes via tunnels) and the service machine functionality (to perform one or more service operations). Also, in some embodiments, one service node can connect to two or more service machines in the identified service chain.

Accordingly, after identifying the service chain for a data message and encapsulating the data message with a tunnel header that contains the network addresses of the service-machine set that perform the service operations in the identified service chain, the method in these embodiments passes the encapsulated data message along a tunnel to a service node that communicatively connects to the first service machine that performs on the data message the first service operation in the identified service chain. In these embodiments, the embedded network addresses of the service machines define a service function path (SFP) in the tunnel header. This SFP along with the service nodes (connected to the service machines on the SFP) and the tunnels that connect these service nodes define a service function chain (SFC) for the data message flow.

At each service node along the SFP, including the service node that connects to the first service machine, the service node inspects the tunnel header and determines that the received data message is addressed to a service machine communicatively connected to the service node. The service node makes this determination in some embodiments by extracting the service index from the tunnel, using this index to retrieve the network address of the current service machine that has to perform the service operation, and then determining that this service machine is one that is connected to the service node.

Once a service node determines that the received data message is addressed to one of its associated service machines, the service node then removes the tunnel header (i.e., decapsulates the received data message), stores information (e.g., the SFP and service index) from this header in a connection storage for later reuse, and provides the data message to the identified, connected service machine for processing. As further described below, the stored information in some embodiments includes information for the service node to re-assemble the tunnel header if it needs to re-encapsulate the data message after it has been processed by the service machines, in order to forward the data message to another service node.

Once the service machine performs its service operation on the data message, it returns the data message to the service node. In some case, a service machine might instruct the service node to drop the data message based on its service operation. In some embodiments, a service node might be connected to two or more service machines that perform two or more successive service operations in a service chain. In such a case, the service node provides the data message (in its current decapsulated state) to the next service machine (connected to the service node) in the service chain, after receiving the data message from a prior service machine in the chain (assuming that the prior service chain did not drop, or instruct the service node, to drop the data message). In some embodiments, the service node determines that the next service machine is also connected to it after receiving the data message from the prior service machine connected to it. In other embodiments, the service node makes this determination before passing the data message to any service machine connected to it (e.g., when it receives the data message through the tunnel, it identifies that the next N service machines in the service chain are connected to it when it receives the data message).

When the service node receives the data message from a connected service machine and the service machine for the next service operation in the service chain is not connected to the service node, the service node resolves the next service machine's network address on the SFP list (stored in its connection storage for the data message) to an underlay tunnel that terminates at the service node connected to the next service machine. In some embodiments, the current service node identifies the network address of the next service machine by using the service index that was embedded in the data message's tunnel header and is now stored in the connection storage of the current service node.

After resolving the next service machine's network address to another underlay tunnel, the current service node sends a re-encapsulated data message along this underlay tunnel to the next service node. The tunnel header of the re-encapsulated data message includes the SFP list that was contained in the original tunnel header that the current service node received. In some embodiments, the current service node modifies this SFP list to remove any network address of any service machine that connects to the current service node and that performed a service operation in the service chain on the data message. In other embodiments, the current service node does not remove the network addresses of any of its associated service machine that performed a service operation on the data message, and instead simply adjusts the service index in the tunnel header to identify the network address of the next service machine that has to perform the next service operation in the service chain.

To formulate the tunnel header for the re-encapsulated data message, the current service node in some embodiments retrieves the information stored from the received data message's tunnel header from its connection storage and updates this information (e.g., updates the SFP list or adjusts the service index). In some embodiments, the service node decrements the service index as the service machine network addresses are identified in the embedded SFP list in reverse order, with the first service machine's address appearing last in the list while the last service machine's address appears first in the list.

In some cases, the last service node communicatively connects to the destination machine of the data message (e.g., the last SVM and the destination GVM execute on the same host computer) without having to go through intervening routing/switching fabric. In these embodiments, the last service node supplies the decapsulated data message to the destination machine. In other cases, the last service node has to go through intervening routing/switching fabric to reach the message's destination. In these cases, after receiving the processed data message from the last service machine, the last service node forwards the data message through intervening routing fabric to its destination. In some of these embodiments, the last service node forwards this data message to its destination through another tunnel.

Some embodiments use Generic Network Virtualization Encapsulation (Geneve) tunneling protocol to carry the service function path information (e.g., the service index and the list of service machine network addresses) and the tenant identifier. In some embodiments, the SFP information is embedded in a new Geneve service function list option TLV (type, length, value) for use between service nodes (called network virtualization edges, NVEs) performing the service forwarding operation in the same network virtualization overlay over Layer 3 (NVO3) domain.

In addition to embedding the SFP information and the tenant identifier in the data message tunnel headers, the method of some embodiments also captures and embeds contextual metadata in these tunnel headers, so that some or all of the service machines along the SFP can process to perform their service operations. For instance, the method can embed the data messages traffic type, and the service machine can based its service operation on this traffic type (e.g., perform its load balancing operation or firewall operation based on the traffic type). Other examples of the contextual metadata include generated QoS ratings, layer 7 parameters, process identifiers, user identifiers, group identifiers, etc.

In addition to basing its service operation on metadata embedded in a received data message's tunnel header, a service machine along the SFP in some embodiments can also generate metadata and provide the metadata to its associated service node to embed in the tunnel header that the service node uses to re-encapsulate the data message before sending it along the SFP. For instance, the service machine might be a DPI machine that identifies the traffic type and provides this traffic type to be embedded in the data message tunnel header for subsequent service machines to use in performing their operations. Alternatively, the service machine might provide, or modify a provided, a QoS rating to be embedded in the data message tunnel header for subsequent service machines to use in performing their operations.

After receiving metadata from a service machine, the service-machine's associated service node in some embodiments might have to perform a new classification operation to validate the remaining service operations and/or remaining service machines in the SFP list or to re-specify these remaining operations and/or service machines. In some embodiments, this service node cannot perform such a classification operation, and hence forwards the data message and the metadata (e.g., the tunnel encapsulated data message with the metadata) to another service node to perform this classification operation. After validating or re-specifying the remainder of the SFP list, the service node (either the one associated with the service machine or the other one that performs the classification operation, if any) forwards the data message in a tunnel to the service node associated with the next service machine in this SFP list.

The above-described methodology is used in some embodiments to express service chains in single tenant environments. Thus, one of ordinary skill will realize that some embodiments of the invention are equally applicable to single tenant datacenters. Conversely, in some embodiments, the above-described methodology is used to carry service chain specification across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 2 illustrates a new Geneve tunnel header of some embodiments.

FIG. 3 illustrates a new Geneve base header of some embodiments.

DETAILED DESCRIPTION

Figure 1:
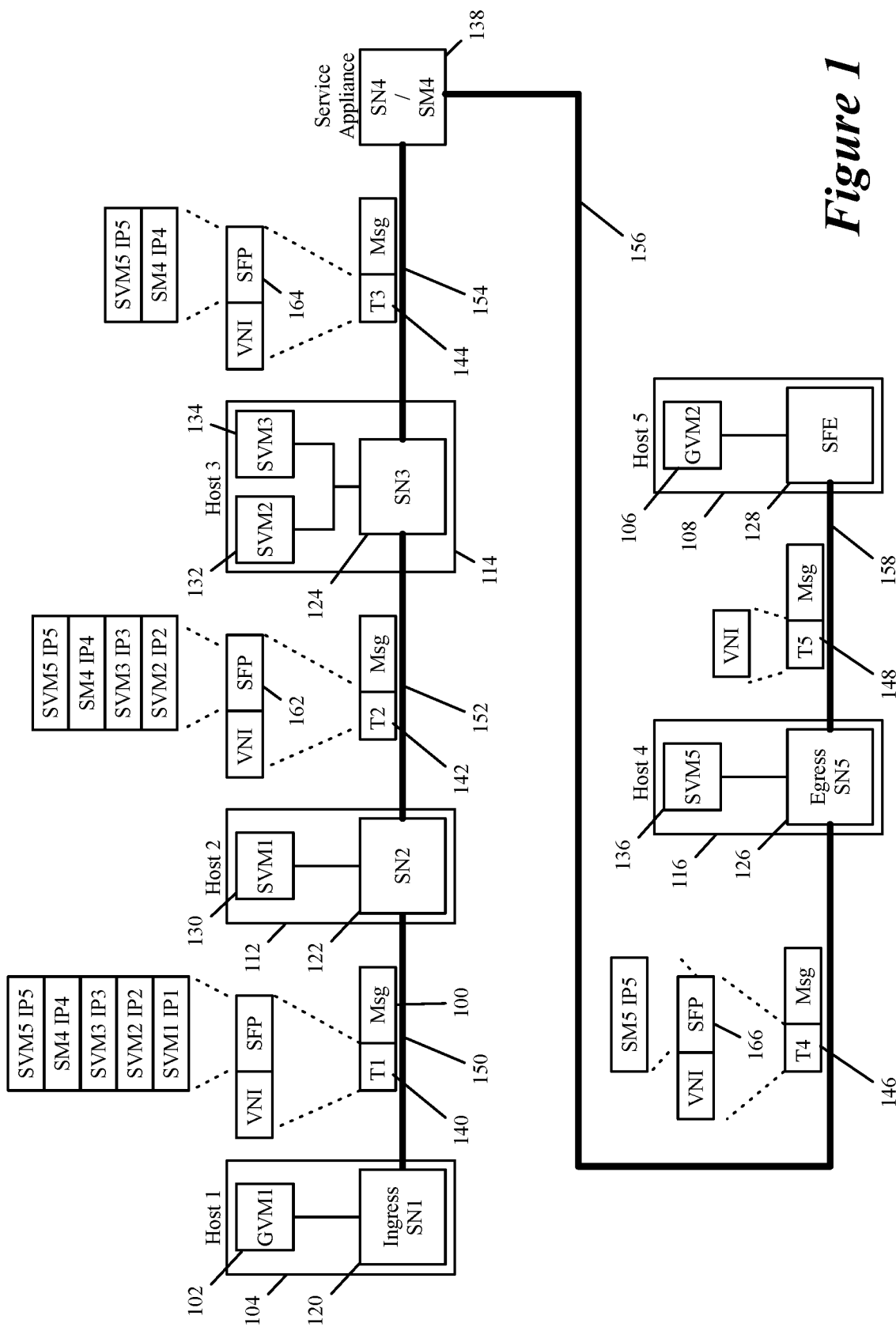
FIG. 1 illustrates an example of specifying and using a service operation chain according to some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a multi-tenant environment, some embodiments of the invention provide a novel method for specifying a set of service operations that a set of service machines have to perform on a tenant's data message flow. In some embodiments, the service machines can be standalone service appliances or computers, and/or service machines (e.g., virtual machines, containers, etc.) executing on host computers along with other service machines and/or tenant machines. Also, in some embodiments, one or more of the service machines are middlebox service machines that perform middlebox service operations, such as load balancing operations, firewall operations, intrusion detection operations, intrusion prevention operations, encryption/decryption operations, etc.

In some embodiments, the method performs a classification operation on the tenant's data message flow in order to identify a sequence of service operations (also referred to below as a chain of service operations) to perform on the data message flow. After identifying this sequence, the method in some embodiments embeds the identified sequence in tunnel headers that it uses to encapsulate the flow's data messages. The method in some embodiments identifies the service chain, and embeds this chain in the tunnel headers, by identifying and embedding a set of network addresses (e.g., destination IP addresses) of a set of service machines that are to perform the service operations in the chain. In these tunnel headers, the method also embeds a tenant identifier (e.g., embeds a VNI, virtual network identifier) to specify that the data messages are associated with a particular tenant (e.g., are emanating from a machine of the particular tenant). The method then sends these encapsulated messages along a tunnel to a service machine that performs a first service operation in the identified service chain.

In some embodiments, the service machines addressed by the network addresses embedded in the tunnel communicatively connect to service nodes that are connected to each other through a set of tunnels. Service nodes can be different types of network elements in different embodiments. For instance, in some embodiments, the service nodes can be (1) host computers on which the service machines execute, (2) standalone forwarding elements connected to the service machines, or (3) service appliances that perform both the service node functionality (to connect to other service nodes via tunnels) and the service machine functionality (to perform one or more service operations). Also, in some embodiments, one service node can connect to two or more service machines in the identified service chain.

Accordingly, after identifying the service chain for a data message and encapsulating the data message with a tunnel header that contains the network addresses of the service-machine set that perform the service operations in the identified service chain, the method in these embodiments forwards the encapsulated data message along a tunnel to a service node that communicatively connects to the first service machine that performs on the data message the first service operation in the identified service chain. In some embodiments, the outer portion of the tunnel header of the encapsulated message identifies the network address (e.g., IP address) of the first service machine's service node (or a virtual tunnel endpoint (VTEP) of the first service machine's service node) as the destination network address (e.g., destination IP address) of the encapsulated data message.

As used in this document, data messages refer to a collection of bits in a particular format sent across a network. One of ordinary skill in the art will recognize that the term data message is used in this document to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates an example of specifying and using a service operation chain according to some embodiments of the invention. In this example, five service machines 130-138 perform five service operations on a data message 100 sent from one guest virtual machine (GVM) 102 executing on one host 104 in a multi-tenant datacenter to another GVM 106 executing on another host 108 in the same datacenter. The GVMs belong to a tenant that is associated in the datacenter with a particular virtual network identifier VNI.

Four of these service machines 130-136 are service virtual machines (SVMs) executing on three hosts 112-116 in the datacenter, with two of these SVMs 132 and 134 executing on one host 114. The fifth service machine is a service appliance 138. All of these service machines 130-138 perform middlebox service operations. In the example illustrated in FIG. 1, the data message 100 is encapsulated with tunnel headers 140-146 and forwarded to the service machines 130-138 by service nodes 120-126 and 138 that are connected to each other through tunnels 150-156. The service appliance 138 acts as its own service node.

Like most tunnel headers, each of the tunnel headers 140-146 has an outer portion (not shown) that identifies the IP addresses of the source and destination endpoints of the tunnel as the source and destination IP addresses of the data message 100 encapsulated by the tunnel header. In some embodiments, the source and destination tunnel endpoints are VTEPs associated with the two service-node endpoints of the tunnel. For example, the outer portion of the tunnel header 140 identifies the IP addresses of a VTEP of the ingress service node 120 as the encapsulated data message's source IP address, while identifying the IP addresses of a VTEP of the service node 122 as the encapsulated data message's destination IP address.

Each of the tunnel headers 140-146 includes the tenant's VNI and a service function path (SFP) list that identifies the remaining portion of the service chain at each service node along the service path. As shown, the SFP list in some embodiments is expressed in terms of the IP addresses of the service machines 130-138. The SFP list along with the service nodes (connected to the service machines on the SFP) and the tunnels that connect these service nodes define a service function chain (SFC) for the data message flow.

In FIG. 1, the service node 120 is an ingress service node that receives the data message from the source GVM 102. As further described below, this service node in some embodiments is formed by a software forwarding element (SFE) and a service orchestrator that execute on the source host computer 104. The SFE intercepts the data message sent by the source GVM 102 and forwards it to the service orchestrator, which then performs a classification operation on the data message, in order to identify a set of service operations to perform on the data message flow.

For some data message flows, the classification operation selects the identified set of service operations from several candidate sets of service operations that are viable service operation sets for similar data message flows of the tenant. In some embodiments, the classification operation is based on a set of attributes associated with the data message flow. This attribute set in some embodiments just includes the data message flow's layer 2-4 header values. In other embodiments, however, the attribute set includes contextual attributes related to the data message flow, such as the data message flow's traffic type (i.e., the type of content carried in the data message flow), QoS ratings, layer 7 parameters, process identifiers, user identifiers, group identifiers, etc.

After identifying the service chain for the intercepted data message, the ingress service node 120 in some embodiments embeds the identified service chain in the tunnel header 140 that it uses to encapsulate the data message 100. As shown, the service node in some embodiments identifies and embeds the service chain in terms of the IP addresses of the service machines 130-138 that are to perform the service operations in the chain. In addition to the IP addresses of these service machines, the ingress service node 120 embeds in the tunnel header a tenant identifier (which in this case is the particular tenant's VNI) to specify that the data message 100 is associated with the particular tenant (e.g., are emanating from a GVM of the particular tenant).

The ingress service node 120 in some embodiments embeds other attributes (e.g., other network addresses) in the tunnel header 140. Also, in some embodiments, the ingress service node 120 embeds in the tunnel header 140 a service operation descriptor (e.g., tag) for each service machine in order to explain the type of service operation that the service machine performs. In other embodiments, no such descriptor is embedded in the tunnel header. Also, the ingress service node 120 in some embodiments embeds a service index value in the tunnel header that identifies one of the embedded network addresses as the network address of the "current" service operation. As further described below, subsequent service nodes use this index in some embodiments to identify the next service machine for performing the next service operation in a service chain.

After identifying the service chain for the data message 100 and encapsulating the data message with the tunnel header 140, the ingress service node 120 passes the encapsulated data message along the tunnel 150 to the service node 122 that communicatively connects to the first service machine 130 that performs on the data message the first service operation in the identified service chain. As mentioned above, the outer portion of the tunnel header 140 in some embodiments identifies the IP addresses of a VTEP of the ingress service node 120 as the encapsulated data message's source IP address, while identifying the IP addresses of a VTEP of the service node 122 as the encapsulated data message's destination IP address.

At each service node 122-126 along the SFP, including the service node 138, the service node inspects the tunnel header and determines that the received data message is addressed to a service machine communicatively connected to the service node. The service node makes this determination in some embodiments by extracting the service index from the tunnel, using this index to retrieve the network address of the current service machine that has to perform the service operation, and then determining that this service machine is one that is connected to the service node.

Once a service node determines that the received data message is addressed to one of its associated service machines, the service node removes the tunnel header (i.e., decapsulates the received data message), stores information (e.g., the SFP and service index) from this header in a connection storage for later reuse, and provides the data message to the identified, connected service machine for processing. As further described below, the stored information in some embodiments includes information for the service node to re-assemble the tunnel header if it needs to re-encapsulate the data message after it has been processed by the service machines, in order to forward the data message to another service node.

Once the service machine performs its service operation on the data message, it returns the data message to the service node. In some case, a service machine might instruct the service node to drop the data message based on its service operation. In some embodiments, a service node (like service node 124) can be connected to two or more service machines (e.g., service machines 132 and 134) that perform two or more successive service operations in a service chain. In such a case, the service node (e.g., node 124) provides the data message (in its current decapsulated state) to the next service machine (e.g., the service machine 134) in the service chain, after receiving the data message from a prior service machine (e.g., the service machine 132) in the chain (assuming that the prior service chain did not drop, or instruct the service node, to drop the data message). In some embodiments, the service node determines that the next service machine is also connected to it after receiving the data message from the prior service machine connected to it. In other embodiments, the service node makes this determination before passing the data message to any service machine connected to it (e.g., when it receives the data message through the tunnel, it identifies that the next N service machines in the service chain are connected to it when it receives the data message).

When the service node receives the data message from a connected service machine and the service machine for the next service operation in the service chain is not connected to the service node, the service node resolves the next service machine's network address on the SFP list (stored in its connection storage for the data message) to an underlay tunnel that terminates at the service node connected to the next service machine. In some embodiments, the current service node identifies the network address of the next service machine by using the service index that was embedded in the data message's tunnel header and is now stored in the connection storage of the current service node.

After resolving the next service machine's network address to another underlay tunnel, the current service node sends a re-encapsulated data messages along this underlay tunnel to the next service node. Again, the outer portion of the tunnel header identifies the IP addresses of the source and destination service nodes of the tunnel as the source and destination IP addresses of the encapsulated data message. This tunnel header also includes the SFP that was contained in the original tunnel header that the current service node received minus any network address of any service machine that connects to the current service node and that performed a service operation in the service chain on the data message. Thus, the SFP list 162 that the service node 122 inserts in the tunnel header 142 does not include the IP address of service machine 130. Similarly, the SFP list 164 that the service node 124 inserts in the tunnel header 144 does not include the IP addresses of prior service machines 130, 132, and 134, while the SFP list 166 that the service node 138 inserts in the tunnel header 146 does not include the IP address of service machine machines 130, 132, 134 and 138.

In other embodiments, the service nodes do not remove the network addresses of their associated service machines before sending out the re-encapsulated data message. As further described below, a current service node in these embodiments simply adjusts the service index in the tunnel header to identify the network address of the next service machine that has to perform the next service operation in the service chain. To formulate the tunnel header for the re-encapsulated data message, the current service node in some embodiments retrieves the information stored from the received data message's tunnel header from its connection storage and updates this information (e.g., updates the SFP list or adjusts the service index). In some embodiments, the service node decrements the service index as the service machine network addresses are identified in the embedded SFP list in reverse order, with the first service machine's address appearing last in the list while the last service machine's address appears first in the list.

In some cases, the last service node communicatively connects to the destination machine of the data message (e.g., the last SVM and the destination GVM execute on the same host computer) without having to go through intervening routing/switching fabric. In these embodiments, the last service node supplies the decapsulated data message to the destination machine. In other cases, the last service node has to go through intervening routing/switching fabric to reach the message's destination. This is the case in FIG. 1. After receiving the processed data message 100 from the last service machine 136, the service node forwards the data message along tunnel 158 through intervening routing fabric to its destination. To send this data message along this tunnel, the service node encapsulates the data message with a tunnel header 148 that includes the tenant's VNI but not an SFP list as all the service operations have been performed on the data message.

Some embodiments use Generic Network Virtualization Encapsulation (Geneve) tunneling protocol to carry the service function path information (e.g., the service index and the list of service machine network addresses) and the tenant identifier.

In some embodiments, the SFP information is embedded in a new Geneve service function list option TLV (type, length, value) for use between service nodes (called network virtualization edges, NVEs) performing the service forwarding operation in the same network virtualization overlay over Layer 3 (NVO3) domain.

In addition to embedding the SFP information and the tenant identifier in the data message tunnel headers, the service nodes of some embodiments also capture and embed contextual metadata in these tunnel headers, so that some or all of the service machines along the SFP can process to perform their service operations. For instance, the service nodes can embed the data message's traffic type, and the service machine can base its service operation on this traffic type (e.g., perform its load balancing operation or firewall operation based on the traffic type). Other examples of the contextual metadata include generated QoS ratings, layer 7 parameters, process identifiers, user identifiers, group identifiers, etc.

In addition to basing its service operation on metadata embedded in a received data message's tunnel header, a service machine along the SFP in some embodiments can also generate metadata and provide the metadata to its associated service node to embed in the tunnel header that the service node uses to re-encapsulate the data message before sending it along the SFP. For instance, the service machine might be a DPI machine that identifies the traffic type and provides this traffic type to be embedded in the data message tunnel header for subsequent service machines to use in performing their operations. Alternatively, the service machine might provide, or modify a provided, a QoS rating to be embedded in the data message tunnel header for subsequent service machines to use in performing their operations.

In some embodiments, the metadata returned by the service machine to the service node includes an SFP list identifier that the service node uses to identify the SFP list associated with the processed data message. In some of these embodiments, the service machine has this SFP list identifier because when the service node provides the data message to the service machine, it provides the SFP list identifier to the service machine as well.

After receiving metadata from a service machine, the service-machine's associated service node in some embodiments might have to perform a new classification operation to validate the remaining service operations and/or remaining service machines in the SFP list or to re-specify these remaining operations and/or service machines. In some embodiments, this service node cannot perform such a classification operation, and hence forwards the data message and the metadata (e.g., the tunnel encapsulated data message with the metadata) to another service node to perform this classification operation. After validating or re-specifying the remainder of the SFP list, the service node (either the one associated with the service machine or the other one that performs the classification operation, if any) forwards the data message in a tunnel to the service node associated with the next service machine in this SFP list.

FIG. 2 illustrates the Geneve tunnel header 200 of some embodiments. As shown, this tunnel header includes an outer header 205, a protocol field 210, a Geneve base header 215, an SFL (service function list) option TLV 220, and a metadata option TLV 225. As described above, the outer header 205 includes the network addresses (e.g., source and destination IP addresses of the two tunnel endpoints, with the source and destination designation depending on the direction of the message flow) in the underlay network that allow the encapsulated data message to traverse the underlay network and reach the tunnel destination endpoint. The protocol field 210 specifies a UDP protocol as well as attributes associated with this protocol.

As further described by reference to FIG. 3, the Geneve base header 215 is 64-bit wide and stores several tunnel parameters, including the tenant identifier and the option length. The Geneve base header is followed by zero or more options in TLV format. In the example illustrated in FIG. 2, the options include a new SFL option TLV and a new metadata option TLV. As further described below by reference to FIG. 4, the SFL option TLV includes the SFP list and the service index. The metadata option TLV stores metadata associated with the data message in the NSH metadata format. This metadata option TLV is described below by reference to FIG. 7. Other embodiments do not use this metadata option TLV, and instead pass metadata relating to the data message in an L2 VLAN header or a Q-in-Q header, or another encapsulation that is known by both the service nodes and service machines.

FIG. 3 illustrates the Geneve base header 215 of some embodiments. As shown, this header in some embodiments is 64-bit wide and stores several tunnel parameters. Its version field 305 is a 2-bit value that specifies the current Geneve tunnel version being used. Tunnel endpoints that receive messages with unknown versions drop the messages. Non-terminating devices processing Geneve packets with an unknown version number treat them as UDP packets with an unknown payload.

The option length field 310 specifies the length of the options fields, expressed in four byte multiples, not including the eight byte fixed tunnel header. This results in a minimum total Geneve header size of 8 bytes and a maximum of 260 bytes. The start of the payload headers can be found using this offset from the end of the base Geneve header.

The O bit 315 specifies whether the data message is an OAM frame that contains a control message instead of a data payload. Endpoints do not forward the payload of this message and transit devices do not attempt to interpret or process it. Since control messages are not frequent, the endpoints typically direct these messages to a high priority control queue. The transit devices do not alter forwarding behavior on the basis of this bit, such as ECMP link selection.

The C bit 320 is a critical option field that when set, indicates that the options are present. One or more options have the critical bit set. If this bit is set then tunnel endpoints parses the options list to interpret any critical options. When this bit is set, endpoints must drop the encapsulated message if they do not recognize this option. On devices where option parsing is not supported, the frame is dropped on the basis of the "C" bit in the base header. If the bit is not set, tunnel endpoints may strip all options using "Opt Len" and forward the decapsulated frame. Transit devices do not drop or modify packets on the basis of this bit.

The first set of reserved bits 325 are 6 bits that must be zero on transmission and ignored on receipt. The protocol type bits 330 are 16 bits that express the type of the protocol data unit appearing after the Geneve header. The VNI bits 335 express a 24-bit identifier for a unique element of a virtual network. In many situations, this may represent an L2 segment; however, the control plane defines the forwarding semantics of decapsulated packets. The VNI may be used as part of ECMP forwarding decisions or may be used as a mechanism to distinguish between overlapping address spaces contained in the encapsulated packet when load balancing across CPUs. The second set of reserved bits are 8 bits and must be zero on transmission and ignored on receipt.

Figure 4:
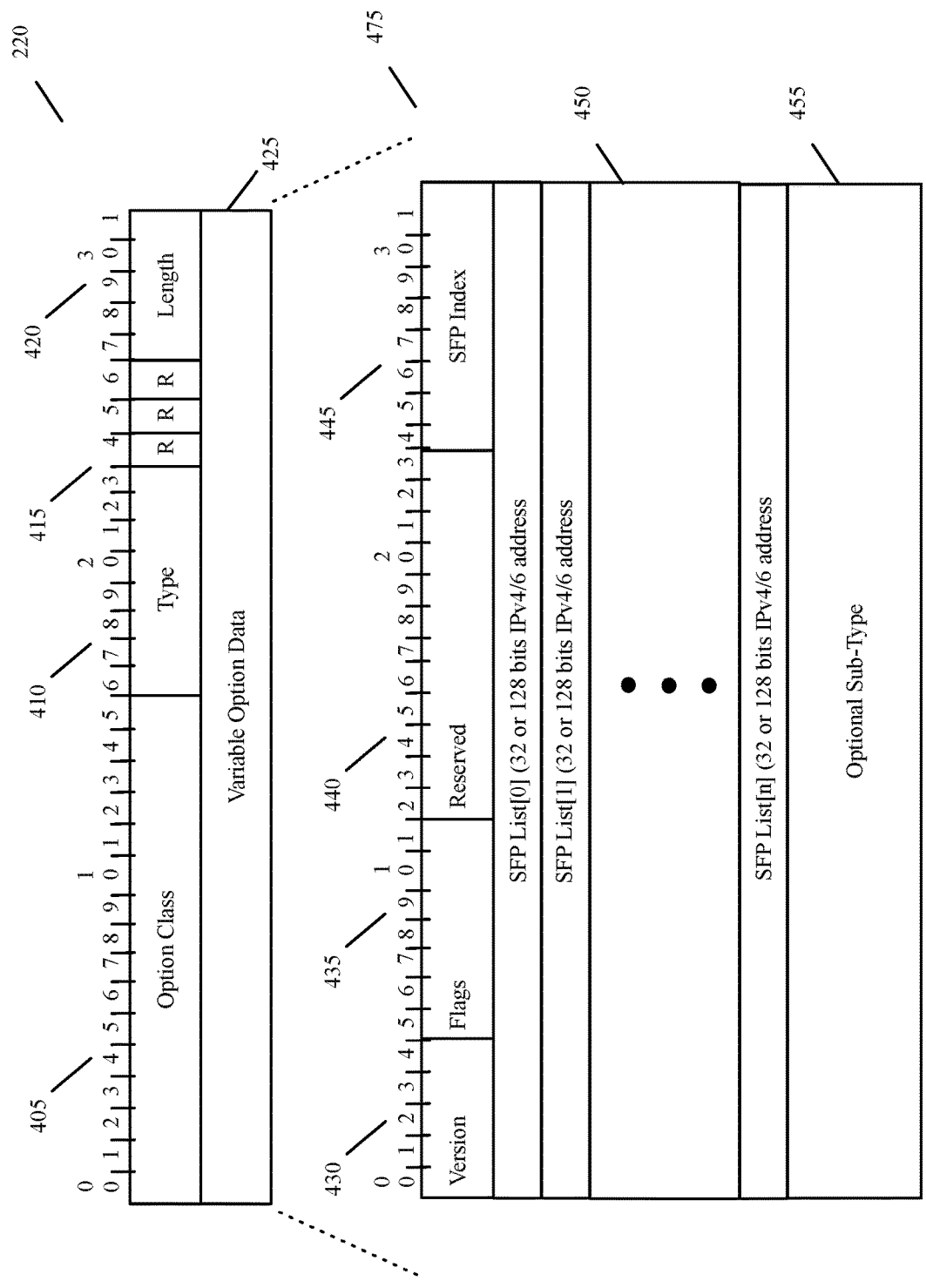
FIG. 4 shows a new SFL (service function list) option TLV header of the Geneve tunnel header of some embodiments.

The Geneve base header is followed by zero or more options in TLV format. Each option includes a four-byte option header and a variable amount of option data interpreted according to the option type. FIG. 4 shows the SFL option TLV header 220 of some embodiments. The SFL option TLV is 8 bytes in this example. This option TLV 220 contains the parameters needed to specify the SFP list and service index. As shown, the option header 405 includes a 16-bit option class, which is the namespace for a type field 410 that indicates the format of the data contained in this option. The type field is to be assigned by IANA, when it creates a "Geneve Option Class" registry to allocate identifiers for organizations, technologies, and vendors that have an interest in creating types for options.

The three R bits 415 are option control flags reserved for future use. These must be zero on transmission and ignored on receipt. The length field includes 5 bits. Length of the option, expressed in four byte multiples excluding the option header. The total length of each option may be between 4 and 128 bytes ([1 to 32]*4). In some embodiments, a data message in which the total length of all options is not equal to the option length in the base header is invalid and is dropped if received by an endpoint.

As shown, the variable option portion 475 of the SFL option TLV header 220 includes the four-byte header field 425, an SFP list 450 and an optional sub-type TLV 455. The SFP list provides 32 or 128 bit addresses of the service machines in the service chain embedded in the Geneve tunnel header. The header field 425 includes a version field 430, SFL flag field 435, reserved bits 440, and SFP index field 445.

The version field 430 is a 5-bit value that specifies the current SFL option TLV version being used. Tunnel endpoints that receive messages with unknown versions drop the messages. The reserved bits 400 should not be set on transmission and are to be ignored on receipt. The SFP Index contains the service index in SFP List. In some embodiments, a service node decrements the service index after the data message has been processed by one of the node's service machines. This is because the SFP List is encoded starting from the last hop of the path, i.e., the first element of the list (SF List [0]) contains the last service function of the path while the last element of the SF List (SF List[n]) contains the first service function in the path.

Figure 5:
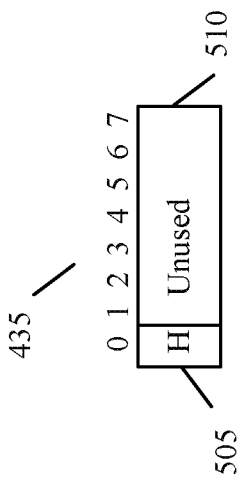
FIG. 5 illustrates an SFL flag field of the new SFL option TLV header of some embodiments.

The SFL flag field is an eight-bit field 435 that is illustrated in FIG. 5. The first value 505 in this field is an HMAC flag, while the other values 510 are left unused. When set, the first value 505 specifies that the HMAC (hashed message authentication code) sub-TLV is present and is encoded as the last sub-TLV 455. HMAC sub-TLV carries parameters for a cryptographic hash function and a secret cryptographic key. In some embodiments, the HMAC is used to simultaneously verify both the data integrity and the authentication of a message.

In some embodiments, only the service nodes that are the destinations of the Geneve tunnel packet will be inspecting the SFP list defined in the SFL Option TLV of the tunnel header. In one deployment that uses the Geneve SFL Option TLVs, only service nodes within a single NVO3 administrative domain are trusted nodes that are enabled to review these TLVs. Service nodes ignore the Geneve SFL lists created by outsiders based on information from the network virtualization authority or some other trusted control plane information.

To prevent non-participating service node from using the Geneve SFL option TLV, some embodiments use an optional security sub-TLV in the SFL option TLV that is based on a key-hashed message authentication code (HMAC). The HMAC optional sub-TLV is located at the end of the Geneve Service Function List option TLV. The purpose of the HMAC optional sub-TLV is to verify the validity, the integrity, and the authorization of the Geneve SFL option TLV itself.

The HMAC sub-TLV will contain (1) HMAC Key-ID, 32 bits wide, and (2) an HMAC field, which is 256 bits wide. The HMAC field is the output of the HMAC computation using a pre-shared key identified by HMAC Key-ID and of the text that is formed by concatenating (1) the source IPv4/IPv6 Geneve tunnel address, (2) the version and flags data, (3) HMAC Key-ID, and (4) all addresses in the SFP list. The HMAC Key-ID field serves as an index to the right combination of pre-shared key and hash algorithms and expect that a value of 0 means that there is no HMAC field. The HMAC selection of a hash algorithm and pre-shared key management in some embodiments follow the procedures described in Draft-ietf-6man-segment-routing-header.

Figure 6:
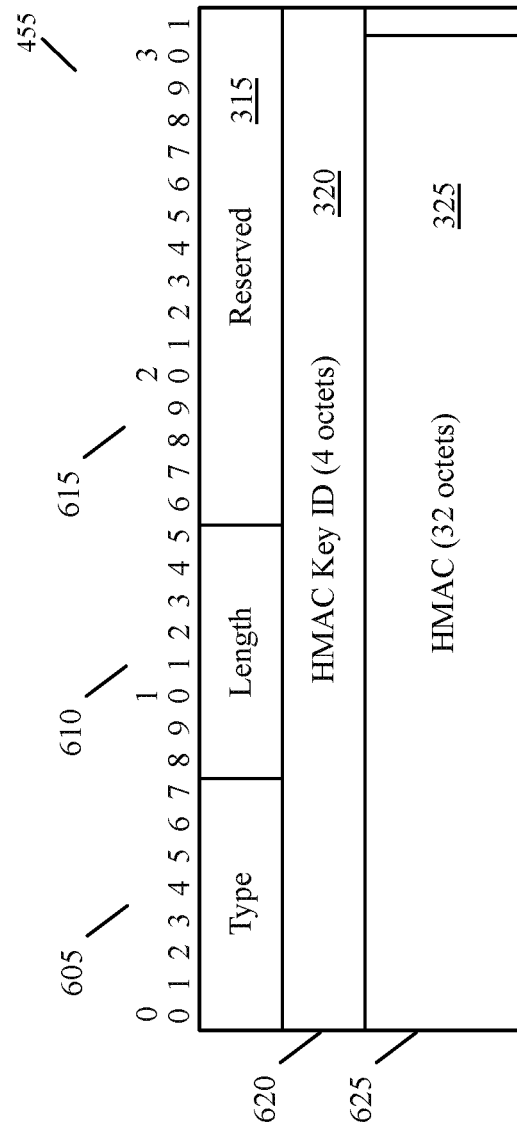
FIG. 6 illustrates an HMAC (hashed message authentication code) sub-TLV of the new SFL option TLV of some embodiments.

FIG. 6 illustrates the HMAC sub-TLV 455 for some embodiments of the invention. This sub-TLV contains the HMAC information. The type field 605 is to be assigned by IANA. The length field 610 is eight bits to express 38 octets of HMAC information. The reserved bits 615 is 2 octets wide. These bits should not be set on transmission and should be ignored on receipt. The HMAC Key ID 620 is 4 octets wide, while the HMAC parameter field 625 is 32 octets wide. When the HMAC sub-TLV is present, the H-Flag is set, and the HMAC sub-TLV is encoded as the last sub-TLV. When the H-flag is set, the service node inspecting the Geneve SFP list Option TLV has to find the HMAC sub-TLV in the last 38 octets of the option TLV.

Figure 7:
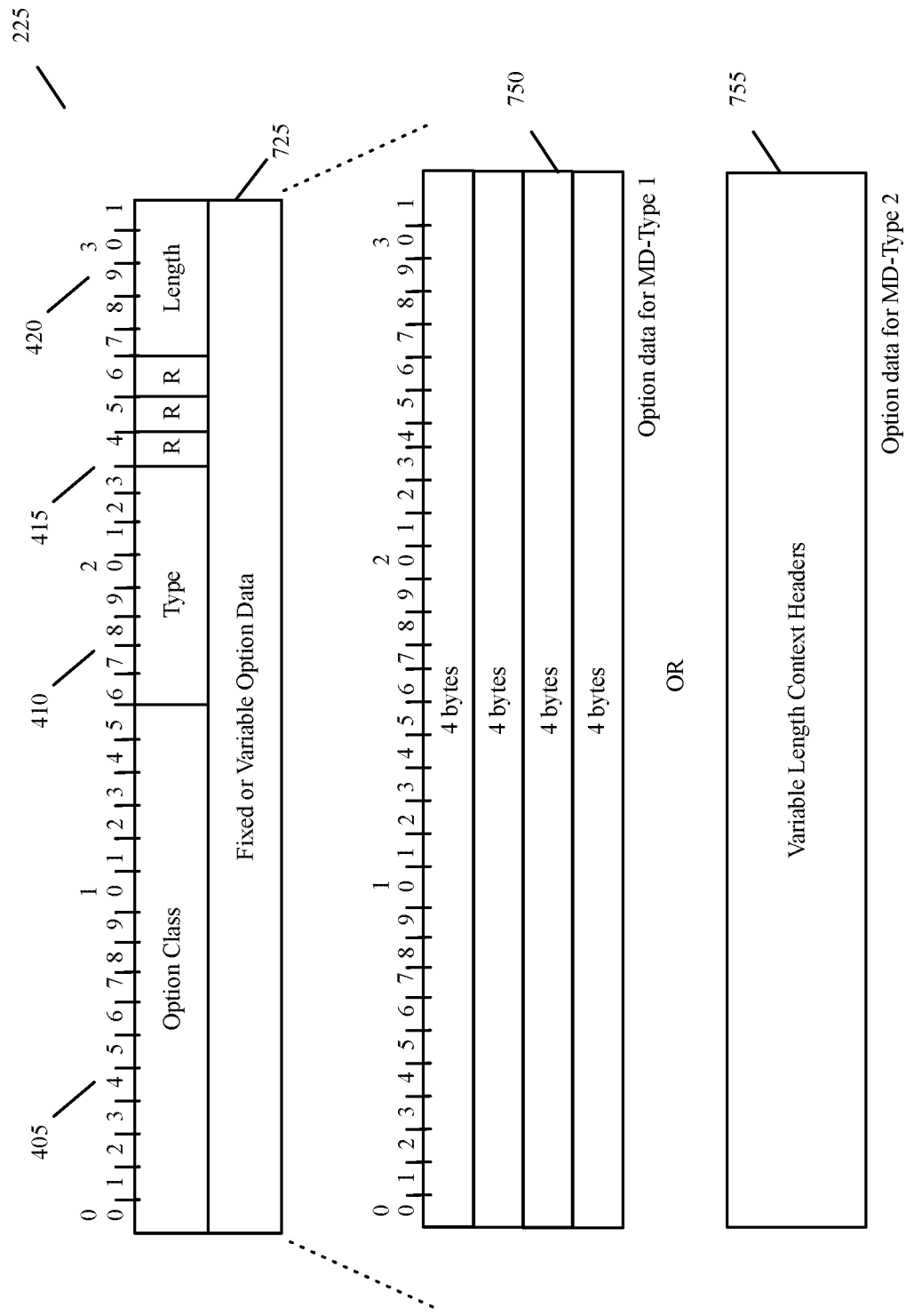
FIG. 7 illustrates a new Geneve NSH (network service header) metadata option TLV of some embodiments.

FIG. 7 illustrates a new Geneve NSH metadata option TLV 225 of some embodiments. As shown, this TLV 225 has a 32-bit header, which include the same first 32 bits of the option, type, reserved and length fields 405, 410, 415, and 420 as the first 32 bits of the SFL Option TLV 220 of FIG. 4. The type field 410 in the NSH metadata option TLV header specifies one of two metadata types, MD type 1 or MD type 2, of the NSH metadata format. As shown in FIG. 7, the TLV 225 also include fixed- or variable-sized option data 725. As shown, the option data is either fixed 16 bytes of value for MD-Type 1 metadata, or variable sized for MD-Type 2 metadata.

Figure 8:
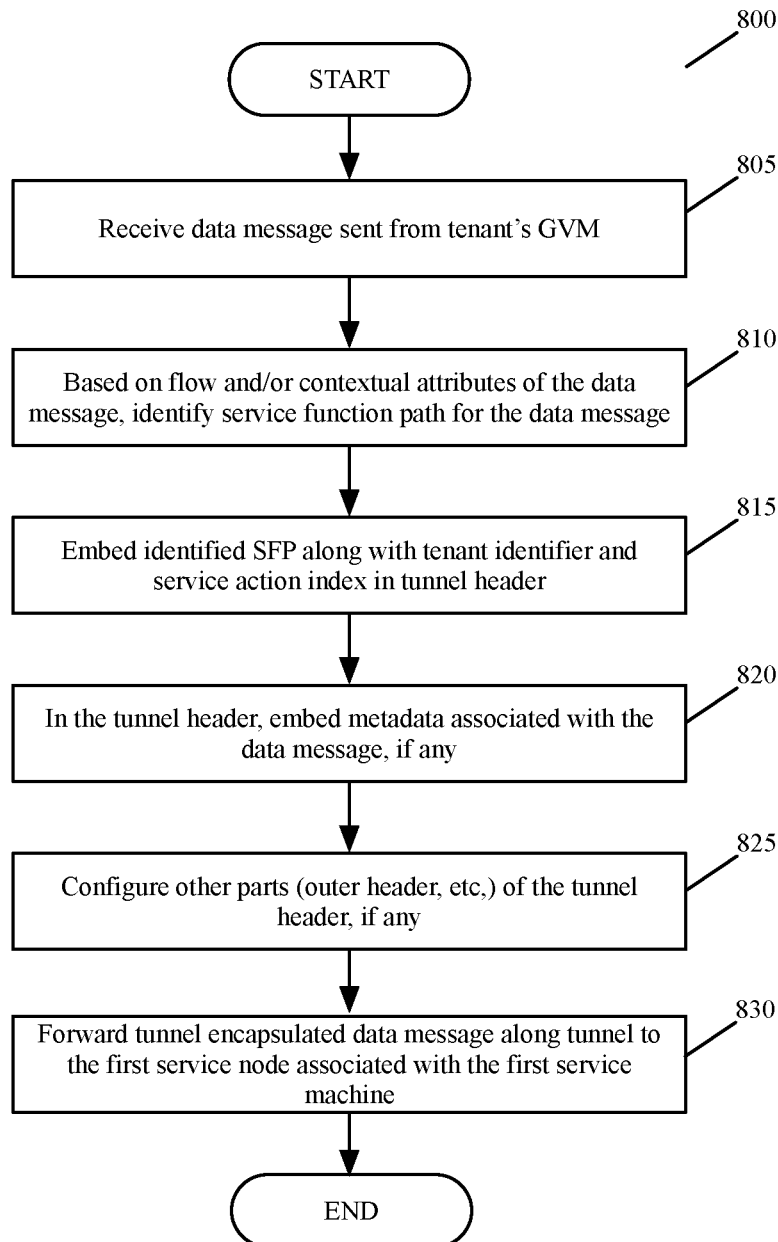
FIG. 8 conceptually illustrates a process performed by an ingress service node in some embodiments.

FIG. 8 conceptually illustrates a process 800 performed by an ingress service node (like node 120) of some embodiments. This process identifies an SFP list for a data message and embeds this SFP list in a Geneve tunnel header that it uses to encapsulate the data message before sending this encapsulated message along a tunnel to the service node that is communicatively connected to the first service machine. In some embodiments, the ingress service node is formed by an SFE (e.g., software switch) and a service orchestrator that execute on the source host computer (e.g., computer 104) along with one or more GVMs (e.g., GVM 102). The GVMs in some embodiments communicatively connect with the SFE, which forwards data messages to and from the GVMs.

As shown, the process 800 initially receives a data message from a tenant GVM (e.g., GVM 102) executing on its host (e.g., 104). In some embodiments, the process 800 receives this data message when the SFE intercepts and forwards it to the service orchestrator. Next, based on a set of attributes associated with the data message, the process (e.g., the service orchestrator) performs (at 810) a classification operation on the data message, in order to identify a set of service operations to perform on the data message flow.

For some data message flows, the classification operation selects the identified set of service operations from several candidate sets of service operations that are viable service operation sets for similar data message flows of the tenant. Also, the classification operation is based on different sets of data-message flow attributes in different embodiments. In some embodiments, this set just includes the data message flow's layer 2-4 header values, while in other embodiments, the attribute set includes contextual attributes related to the data message flow, such as the data message flow's traffic type (i.e., the type of content carried in the data message flow), QoS ratings, layer 7 parameters, process identifiers, user identifiers, group identifiers, etc.

For instance, in some embodiments, the process performs this classification operation by comparing one or more attributes of the data message (e.g., the data message's 5-tuple identifier and/or associated metadata) with rule identifiers of several service rules stored in a rule storage. In addition to its rule identifier, each rule specifies a set of service actions, which in some embodiments are specified as IP addresses of service machines for performing the service actions. As mentioned above, each IP address in some embodiments can be specified as a VIP that specifies a service cluster of two or more service machines that performs the same service operation. The service node in some embodiments performs a load balancing operation to convert each service machine cluster's VIP to one DIP for the flow of the data message being processed. A host architecture for capturing and using contextual attributes will be further described below by reference to FIG. 10.

After identifying (at 810) the service chain for the intercepted data message, the process 800 embeds (at 815) the identified service chain in an SFL option TLV 220 of a Geneve tunnel header 200 that it will use to encapsulate the received data message. As described above, the SFL option TLV stores the service chain in terms of the IP addresses of the service machines that are to perform the service operations in the chain. Also, as further described above, the SFL option TLV stores these IP addresses in reverse order, with the first service machine's address appearing last in the list while the last service machine's address appears first in the list.

In the SFL option TLV, the process also stores (at 815) the service index value 445. The process sets this value to identify the last network address in the SFP list, which is the address of the first service machine. The service index value is used to identify the embedded network address of the "current" service operation, and subsequent service nodes use this index in some embodiments to identify the next service machine for performing the next service operation in a service chain. In some embodiments, the process 800 embeds in the SFL option TLV a service operation descriptor (e.g., tag) with each service machine address to explain the type of service operation that the service machine performs. In other embodiments, no such descriptor is embedded in the tunnel header. If the Geneve tunnel needs to have its HMAC parameters set, the process also defines (at 815) the HMAC sub-TLV and sets its parameters.

At 815, the process 800 also embeds in the base header 215 of the Geneve tunnel header the VNI of the tenant associated with the source GVM that sent the received data message. After embedding the VNI, the process 800 identifies (at 820) one or more metadata attributes associated with the received data message, and stores the identified metadata in an NSH metadata option TLV 225. In different embodiments, the process 800 identifies and embeds different metadata. Examples of such metadata include the data messages traffic type, a QoS ratings, layer 7 parameters, process identifiers, user identifiers, group identifiers, etc. A host architecture for capturing and embedding metadata attributes will be further described below by reference to FIG. 10.

The process embeds this metadata in the Geneve tunnel header because one or more services along the SFP can process the metadata in order to perform their service operations. In some cases, the service machines along the identified SFP do not use any metadata associated with the data message to perform their operations on the data message. In these cases, the process does not embed any metadata in the Geneve tunnel header and therefore does not include the NSH metadata option TLV in this header.

Next, at 825, the process configures other parts of the Geneve tunnel header. For instance, the process stores in the outer portion header 205 of the tunnel header 200 the L2 and L3 network addresses of its VTEP (e.g., a VTEP associated with its SFE) and the VTEP of the service node associated with the first service machine as the source and destination network addresses. At 825, the process defines the UDP protocol in the Geneve tunnel header, and sets any other fields that need to be define, per the discussion above and the tunnel deployment configuration being used.

After finalizing the tunnel header configuration (at 825), the process passes (at 830) the encapsulated data message along a Geneve tunnel to the service node (e.g., node 122) associated with the first service machine (e.g., service machine 130) that performs on the data message the first service operation in the identified service chain. To send this data message, the process in some embodiments resolves the IP address of the first service machine to the tunnel that connects the ingress service node to the service node of the first service machine. After 825, the process ends.

In some cases, the ingress service node executes on a host computer that executes the source machine (e.g., source VM or container) for a data message as well as the first service machine or the first several service machines that are to perform the first or first several service operations on the data message. In these cases, the ingress service node first passes the data message to this service machine or these service machines, before encapsulating the data message with a tunnel header and forwarding it to the next service machine in the chain.

Figure 9:
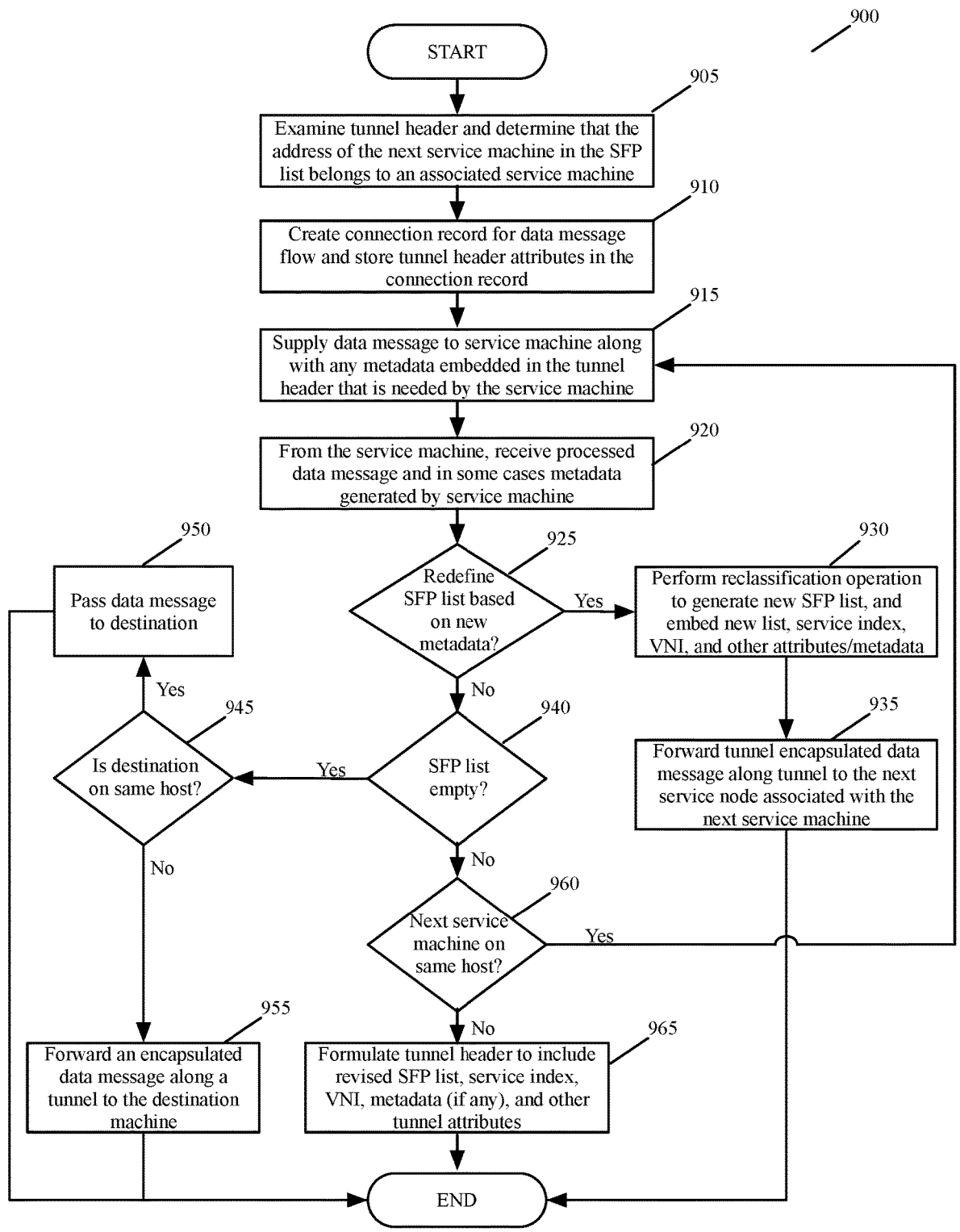
FIG. 9 illustrates a process that a service node performs when it receives a Geneve-encapsulated data message.

FIG. 9 illustrates a process 900 that a service node performs when it receives a Geneve-encapsulated data message. In some embodiments, this service node executes on a host computer along with one or more service machines (e.g., SVMs or service containers) and one or more tenant machines (e.g., GVMs). As shown, the process inspects (at 905) the tunnel header and determines that the received data message is addressed to a service machine communicatively connected to the service node. The service node makes this determination in some embodiments by extracting the service index from the tunnel, using this index to retrieve the network address of the current service machine that has to perform the service operation, and then determining that this service machine is one that is connected to the service node.

Once the process 900 determines (at 905) that the received data message is addressed to one of its associated service machines, the process 900 (at 910) removes the tunnel header (i.e., decapsulates the received data message), and stores information (e.g., the SFP, service index, metadata, etc.) from this header in a connection storage for later reuse. At 915, the process 900 in some embodiments provides the data message to the identified, connected service machine for processing and removes the IP address of this service machine from the received SFP list. Instead of removing the IP address of this service machine, the process 900 in other embodiments adjusts the current service index (e.g., decrements the service index by 1 in the embodiments that define the IP addresses of the service machines in the reverse order) after providing the data message to the identified connected service machine for processing.

When the extracted tunnel header contains metadata for the data message, and the service machine needs some or all of the metadata to perform its service operation, the process provides (at 915) the needed metadata to the service machine. In some embodiments, the process provides the data message and/or the metadata by passing one or more identifiers to the service machine that identify the location at which the data message and/or the metadata are stored in a memory.

Once the service machine performs its service operation on the data message, the process receives (at 920) the processed data message at the service node. In some embodiments, the service machine returns metadata along with the processed data message. In some embodiments, the service machine provides the data message and/or the metadata by passing one or more identifiers to the process 900 that identify the location at which the processed data message and/or the metadata are stored in a memory. The returned metadata can be metadata that the service machine generates in processing the data message or the data message's flow, or captures (e.g., through deep packet inspection) from the received data message or from the data message's flow.

In some embodiments, the metadata returned (at 920) by the service machine to the service node includes an SFP list identifier that the service node uses to identify the SFP list associated with the processed data message. In some of these embodiments, the service machine has this SFP list identifier because when the service node provided (at 915) the data message to the service machine, it provided the SFP list identifier to the service machine as well.

To capture or generate the metadata, the service machine in some embodiments might need to process several data messages that are part of the same data message flow as the data message for which the process 900 is performed. For instance, the service machine might have to perform a soft connection termination to examine the content of the data messages in the flow. Hence, in these embodiments, the service node might provide multiple data messages that are part of the same flow before it receives processed results for earlier supplied data messages.

In some cases, a service machine might instruct the service node to drop the data message based on its service operation. Assuming that the service machine does not direct the service node to drop the received data message, the process 900 determines (at 925) whether it should perform classification operation to identify a new service chain for the data message based on metadata returned (at 920) by the service machine. This operation is performed because the service machine in some embodiments can return metadata, which provides additional information about the data message being processed, and this additional information might require the service chain to be redefined for the data message.

In some embodiments, the determination (at 925) is based on whether the service machine returned a certain type of metadata when it returned the processed data message.

When the process determines (at 925) that it has to perform a classification operation, it performs (at 930) the classification operation to identify a new SFP list. In some embodiments, the process performs this classification operation by comparing one or more attributes of the data message (e.g., the data message's 5-tuple identifier and associated metadata) with rule identifiers of several service rules stored in a rule storage. In addition to its rule identifier, each rule specifies a set of service actions, which in some embodiments are specified as IP addresses of service machines for performing the service actions. As mentioned above, each IP address in some embodiments can be specified as a VIP that specifies a service cluster of two or more service machines that performs the same service operation. The service node in some embodiments performs a load balancing operation to convert each service machine cluster's VIP to one DIP for the flow of the data message being processed.

At 930, the process defines a Geneve tunnel header for the data message, and embeds the SFP list that it generated (at 930) in this tunnel header along with the source tenant machine's VNI, the service index for the SFP list, any needed metadata associated with the data message (possible including metadata returned by the service machine at 920), and other Geneve tunnel attributes. Next, at 935, the process encapsulates the processed data message with the tunnel header defined at 930, and sends the encapsulated data message along a Geneve tunnel to the next service node associated with the first service machine in the re-specified SFP list. To send this data message, the process in some embodiments resolves the IP address of the first service machine to the tunnel that connects the current service node to the service node of the first service machine. The outer portion of the tunnel header identifies the source and destination IP addresses as the IP addresses of the VTEPs of the current service node and the next service node. After 935, the process 900 ends.

When the process determines (at 925) that it does not need to perform a classification operation, the process determines (at 940) whether the SFP list for the data message is now empty. An empty SFP list would be indicate that all the service operations have been specified for the received data message. As mentioned above, the process 900 in some embodiments (at 915) removes the IP address of the last service machine from the SFP list or adjusts the service index, before supplying (at 915) the data message to this service machine. In the embodiments that do not remove the service machine IP address from the SFP list and instead adjust the service index value, the process makes this determination (at 940) by determining whether the service index value indicates that all of the service machines identified in the SFP list have processed the data message. For instance, in some embodiments that decrement the service index each time the data message is passed to another service machine, the process determines that the SFP list is empty when the service index reaches zero, or some other service index value associated an empty SFP list.

When the process determines (at 940) that the SFP list is empty, the process determines (at 945) whether the destination of the data message is on the same host computer (i.e., determines whether a machine with network addresses (e.g., L2-L4 addresses) specified in the data message's header is executing on the same host computer). When the destination is on the same host computer, the process passes (at 950) the processed data message to the destination machine, and then ends. When the destination is not on the same host computer, the process (at 955) uses the destination IP address to identify the tunnel to use to forward the data message to its destination, and then encapsulates the data message with a header of this tunnel before sending the data message along the tunnel to its destination (e.g., using tunnel 158 to send the message 100 to SFE 128 of host 108 to pass the data message to the GVM 106). The outer portion of the tunnel header identifies the source and destination IP addresses as the IP addresses of the VTEPs of the current service node and the destination machine (when a standalone machine) or a host computer on which the destination machine executes. After 955, the process ends.

When the process determines (at 940) that the SFP list is not empty (i.e., determines that this list or the service index still identifies at least one IP address of at least one other service machine that has to perform at least one other service operation), the process determines (at 960) whether the service machine associated with the next IP address executes on the same host computer. In some embodiments, the process identifies the network address of the next service machine by using the service index that was embedded in the data message's tunnel header and is now stored in the connection storage of the current service node after it was decremented at 915.

The process 900 performs the check at 950 because in some embodiments, a service node (like service node 124) can be connected to two or more service machines (e.g., service machines 132 and 134) that perform two or more successive service operations in a service chain. In such a case, the process returns to 915 (e.g., the service node 124) to provide the data message (in its current decapsulated state) to the next service machine (e.g., the service machine 134) in the service chain, after receiving the data message from a prior service machine (e.g., the service machine 132) in the chain (assuming that the prior service chain did not drop, or did not instruct the service node to drop, the data message). In some embodiments, the process determines (at 960) that the next service machine is connected to it after receiving the data message from the prior service machine connected to it. In other embodiments, the process makes this determination (at 905) before passing the data message to any service machine connected to it (e.g., when it receives the data message through the tunnel, it identifies that the next N service machines in the service chain are connected to it when it receives the data message).

When the process determines (at 960) that the data message is not to be next processed by another service machine that executes on the same host computer, the process resolves (965) the next service machine's network address on the SFP list (stored in its connection storage for the data message) to the underlay tunnel that terminates at the service node connected to the next service machine. After resolving the next service machine's network address to another underlay tunnel, the process sends (at 965) a re-encapsulated data message along this underlay tunnel to the next service node. The outer portion of the tunnel header identifies the source and destination IP addresses as the IP addresses of the VTEPs of the current service node and the next service node.

This tunnel header also includes the SFP list that was contained in the original tunnel header that the current service node with an adjusted service index (e.g., with a decremented service index) or minus any network address of any service machine associated with the current service node that performed a service operation in the service chain on the data message (e.g., the SFP list 162 that the service node 122 inserts in the tunnel header 142 does not include the IP address of service machine 130). To formulate the tunnel header (at 935 or 965) for the re-encapsulated data message, the process 900 in some embodiments retrieves the information stored from the received data message's tunnel header from its connection storage and, if necessary, updates this information (e.g., updates the metadata based on metadata received from the service machine(s)).

For some service operations (e.g., firewall operations, load balancing operations) of some service machines, the service node stores the service machine's operational result in a cache storage after processing the first data message, so that the service node does not have to re-perform 900 for subsequent data messages that are part of the same flow as the first data message. When the service node receives another data message that is part of the same flow as the first data message, the process checks the cache storage to determine whether it has processed an earlier data message of the same flow. If so, the service node retrieves the service machine's operational result for the earlier data message from the cache storage, and uses this result for the data message that it is processing.

Figure 10:
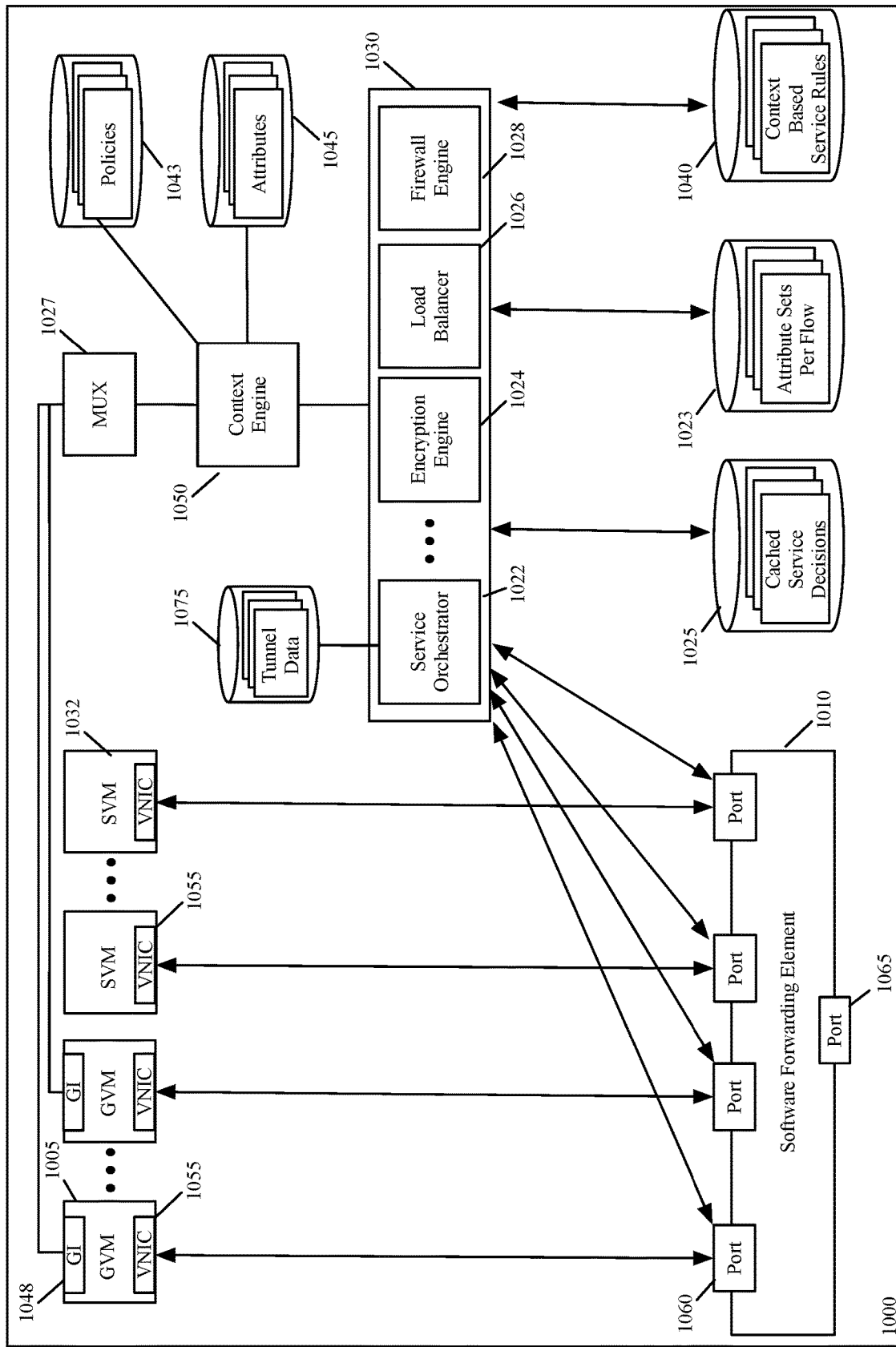
FIG. 10 illustrates a host computer that is used in some embodiments to execute the virtual machines, service machines and service nodes of some embodiments.

FIG. 10 illustrates a host computer 1000 that is used in some embodiments to execute the GVMs, service machines, and service nodes of some embodiments. This host computer performs context-rich, attribute-based services in a datacenter. This host computer 1000 includes several GVMs 1005, SVMs 1032, a software forwarding element 1010, a context engine 1050, service engines 1030, context-based service rule storage 1040, context-attribute storage 1045, an attribute-mapping storage 1023, a connection state cache storage 1025, a MUX (multiplexer) 1027, and a context-engine policy storage 1043. The service engines 1030 include a service orchestrator 1022, an encryption engine 1024, a load balancer 1026, a firewall engine 1028, and one or more other service engines (not shown).

In FIG. 10, the GVMs 1005 execute on a hypervisor. In some embodiments, the context engine 1050, the software forwarding element 1010, the service engines 1030, the context-based service rule storages 1040, the connection state cache storage 1025, the context-engine policy storage 1043, and the MUX 1027 operate in the kernel space of the hypervisor, while the GVMs 1005 operate in the hypervisor's user space. In other embodiments, one or more service engines are user space modules (e.g., are service VMs).

In some embodiments, the GVMs 1005 serve as data end points in the datacenter. Examples of such machines include webservers, application servers, database servers, etc. In some cases, all the VMs belong to one entity, e.g., an enterprise that operates the host. In other cases, the host 1000 operates in a multi-tenant environment (e.g., in a multi-tenant data center), and different GVMs 1005 may belong to one tenant or to multiple tenants.

Each GVM 1005 includes a GI agent 1048 that communicates with the context engine 1050 to provide context attribute sets to this engine, and to receive instructions and queries from this engine. This communication between the context engine 1050 and the GI agents 1048 is relayed through the MUX 1027. One example of such a mux is the mux that is used by the Endpoint Security (EPSec) platform of ESX hypervisors of VMware, Inc. In some embodiments, the attributes collected by the context engine 1050 from the GI agents 1048 include a rich group of parameters (e.g., layer 7 parameters, process identifiers, user identifiers, group identifiers, etc.). U.S. patent application Ser. No. 15/650,251 filed on Jul. 14, 2017, further describes the capturing and use of these contextual attributes through the GI agent 1048. The U.S. patent application Ser. No. 15/650, 251 is incorporated herein by reference.

The SVMs 132 perform service operations on data messages, including those forwarded by the service orchestrator 1022, as further described below. As shown, each VM 1005 and 1032 includes a virtual network interface card (VNIC) 1055 in some embodiments. Each VNIC is responsible for exchanging messages between its VM and the SFE 1010. Each VNIC connects to a particular port 1060 of the SFE 1010. The SFE 1010 also connects to a physical network interface card (NIC) (not shown) of the host. In some embodiments, the VNICs are software abstractions created by the hypervisor of one or more physical NICs (PNICs) of the host.

In some embodiments, the SFE 1010 maintains a single port 1060 for each VNIC of each VM. The SFE 1010 connects to the host PNIC (through a NIC driver (not shown)) to send outgoing messages and to receive incoming messages. In some embodiments, the SFE 1010 is defined to include a port 1065 that connects to the PNIC's driver to send and receive messages to and from the PNIC. The SFE 1010 performs message-processing operations to forward messages that it receives on one of its ports to another one of its ports. For example, in some embodiments, the SFE tries to use data in the message (e.g., data in the message header) to match a message to flow-based rules, and upon finding a match, to perform the action specified by the matching rule (e.g., to hand the message to one of its ports 1060 or 1065, which directs the message to be supplied to a destination VM or to the PNIC).

In some embodiments, the SFE 1010 is a software switch, while in other embodiments it is a software router or a combined software switch/router. The SFE 1010 in some embodiments implements one or more logical forwarding elements (e.g., logical switches or logical routers) with SFE executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 10 Networks over Layer 3 Networks, IETF.

The ports of the SFE 1010 in some embodiments include one or more function calls to one or more modules that implement special input/output (I/O) operations on incoming and outgoing messages that are received at the ports. Examples of I/O operations that are implemented by the ports 1060 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports can implement a chain of I/O operations on incoming and/or outgoing messages in some embodiments. Also, in some embodiments, other modules in the data path (such as the VNICs 1055, port 1065, etc.) implement the I/O function call operations instead of, or in conjunction with, the ports 1060.

In some embodiments, one or more of function calls of the SFE ports 1060 can be to one or more service engines 1030 that process context-based service rules in the context-based service rule storages 1040. Each service engine 1030 in some embodiments has its own context-based service rule storage 1040, attribute-mapping storage 1023, and connection state cache storage 1025. FIG. 10 presents just one context-based service rule storage 1040, attribute-mapping storage 1023, and connection state cache storage 1025 for all the service engines in order not to obscure the presentation in this figure with unnecessary detail. Also, in some embodiments, each VM can have its own instance of a service engine (e.g., its own instance of encryption engine 1024, load balancer 1026, and firewall engine 1028). In other embodiments, one service engine can service data message flows for multiple VMs on a host (e.g., VMs for the same logical network).

To perform its service operation for a data message flow, a service engine 1030 in some embodiments tries to match the flow identifier (e.g., the five-tuple identifier) and/or the flow's associated context attribute set to the rule identifiers of its service rules in its context-based service rule storage 1040. Specifically, for a service engine 1030 to perform its service check operation for a data message flow, the SFE port 1060 that calls the service engine supplies a set of attributes of a message that the port receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domains. In still other embodiments, some of the identifier values are defined in the logical domain, while other identifier values are defined in the physical domain.

The service engine in some embodiments then uses the received message's attribute set (e.g., the message's five-tuple identifier) to identify the context attribute set that the service engine has stored for this flow in the attribute-mapping storage 1023. As mentioned above, the context engine 1050 in some embodiments supplies the context attributes for new flows (i.e., new network connection events) to the service engines 1030, along with a flow identifier (e.g., a five-tuple identifier). The context-engine policy storage 1043 contains the rules that control the operation of the context engine 1050. In some embodiments, these policies direct the context engine to generate rules for the service engines or to direct the service engines to generate rules. The service engines 1030 in these embodiments store the context attributes that they receive from the context engine in the attribute-mapping storage 1023.

In some embodiments, a service engine 1030 stores the context attribute set for each new flow with that flow's identifier (e.g., five-tuple identifier) in the attribute-mapping storage. In this manner, the service engine can identify the context attribute set for each new flow that it receives from the SFE ports 1060 by searching its attribute-mapping storage 1023 for a context record that has a matching flow identifier. The context record with the matching flow identifier includes the context attribute set for this flow. Similarly, to identify the context attribute set for a process event, a service engine in some embodiments searches its attribute-mapping storage 1023 for a context record with a matching process identifier.

Some or all of the service engines in some embodiments pull the context attribute sets for a new flow from the context engine. For instance, in some embodiments, a service engine supplies a new flow's five-tuple identifier that it receives from the SFE port 1060, to the context engine 1050. This engine 1050 then examines its attribute storage 1045 to identify a set of attributes that is stored for this five-tuple identifier, and then supplies this attribute set (or a subset of it that it obtains by filtering the identified attribute set for the service engine) to the service engine.

Some embodiments implement the pull model by using a service token to encode the attribute set for a new message flow. When notified of a new network connection event, the context engine 1050 in some embodiments (1) collects the context attribute set for the new event, (2) filters this set to discard the attributes that are not relevant for performing one or more services on the flow, (3) stores the remaining filtering attribute subset in the attribute storage 1045 along with a service token, (4) provides the service token to the GI agent 1048. The GI agent 1048 then causes this token to be passed to the service engine(s) in-band (e.g., in a header of the data message that the agent's VM sends to a destination) or out-of-band (i.e., separately from the data messages that the agent's VM sends to a destination).

When the service engine gets the new flow through the SFE port 1060, it supplies this flow's service token to the context engine, which uses this service token to identify in its attribute storage 1045 the context attributes to supply to the service engine. In the embodiments that the SFE port does not provide this service token to the service engine, the service engine first has to identify the service token by searching its data stores using the flow's identifier before supplying the service token to the context engine.

After identifying the contextual attribute set for a data message flow, the service engine 1030 in some embodiments performs its service operation based on service rules that are stored in the context-based service rule storage 1040. To perform its service operation, the service engine 1030 matches the received attribute subset with corresponding attribute sets that are stored for the service rules. In some embodiments, each service rule in the context-based service rule storage 1040 has a rule identifier and an action parameter set.

As mentioned above, the rule identifier of a service rule in some embodiments can be defined in terms of one or more contextual attributes that are not L2-L4 header parameters (e.g., are L7 parameters, user identifiers, group identifiers, process name, loaded module identifiers, consumption parameters, etc.). In some embodiments, a rule identifier can also include L2-L4 header parameters. Also, in some embodiments, one or more parameters in a rule identifier can be specified in terms of an individual value or a wildcard value. Also, in some embodiments, a rule identifier can include a set of individual values or a group identifier, such as a security group identifier, a compute construct identifier, a network construct identifier, etc.

To match a received attribute set with the rules, the service engine compares the received attribute set with the associated identifiers of the service rules stored in the context-based service rule storage 1040. Upon identifying a matching rule, the service engine 1030 performs a service operation (e.g., a service-orchestration operation, a firewall operation, a load balancing operation, an encryption operation, other middlebox operation, etc.), based on the action parameter set (e.g., based on the service action list, Allow/Drop parameters, the load balancing criteria, encryption parameters, etc.) of the matching rule.

In some embodiments, the context-based service rule storage 1040 is defined in a hierarchical manner to ensure that a message rule check will match a higher priority rule before matching a lower priority rule when the message's attribute subset matches multiple rules. Also, in some embodiments, the context-based service rule storage 1040 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a data message with a service rule in the context-based service rule storage 1040 based on the message's identified context attribute set, the service engine of some embodiments stores the service rule (or a reference to the service rule) in the connection state cache storage 1025, so that it can later use this service rule for subsequent data messages of the same flow.

In some embodiments, the connection state cache storage 1025 stores the service rule, or a reference to the service rule, that the service engine 1030 identifies for different message identifier sets (e.g., for different five-tuple identifiers that identify different data message flows). In some embodiments, the connection state cache storage 1025 stores each service rule, or reference to the service rule, with an identifier (e.g., a flow's five-tuple identifier) that is generated from the matching message identifier set.

Before checking with the context-based service rule storage 1040 for a particular message, the service rule engine 1030 of some embodiments checks the connection state cache storage 1025 to determine whether this storage has previously identified a service rule for this message's flow. If not, the service engine 1030 identifies the contextual attribute set for the message flow, and then checks the context-based service rule storage 1040 for a service rule that matches the message's identified attribute set and/or its five-tuple identifier. When the connection state data storage has an entry for the particular message, the service engine performs its service operation based on this service rule's action parameter set.

As mentioned above, a service node on a host computer in some embodiments is formed by (1) the software forwarding element 1010 associated with the VTEP that serves as a Geneve tunnel endpoint, and (2) the service orchestrator 1022. For an ingress service node (e.g., service node 120), the service orchestrator performs the operations of the process 800 of FIG. 8 in some embodiments. For instance, it retrieves the metadata captured by the context engine 1050 for a particular data message flow. For a data message sent by a GVM 1005 on its host computer, the service orchestrator 1022 identifies the SFP list by matching the message's flow identifier and/or contextual metadata attributes to its service rule in the rule storage 1040.

In some embodiments, each of the orchestrator's service rule in the storage 1040 specifies a service chain in terms of a list of IP addresses (and in some cases a service tag descriptor) for each service operation in the service chain. After matching the message's attribute set with one of its service rules, the service orchestrator 1022 of the ingress node embeds the SFP list of the matching service rule in a Geneve tunnel header, along with other tunnel attributes described above (e.g., service index, etc.).

Also, in some embodiments, the orchestrator embeds some or all of the metadata obtained from the context engine 1050 in the NSH metadata option TLV of the Geneve tunnel header. In some embodiments, the service orchestrator 1022 has another one of the service engines 1030 perform the tunnel encapsulation. After encapsulating the data message with a Geneve tunnel header 200, the service orchestrator returns the data message to the SFE (e.g., provides a handle for the location in memory at which the encapsulated data message is stored) so that the SFE can forward the data message along the Geneve tunnel to the service node associated with the first service machine in the specified SFP list.

In some cases, it is possible for the first service operation or the first few service operations to have to be performed by one or more SVMs 1032 or service engines 1030 on the same host as the source GVM and ingress service orchestrator. In these cases, the service orchestrator directs the data message to the SVM(s) or service engine(s) on its hosts before encapsulating the data message with a tunnel header. After all the specified service operations have been performed on its host computer, the service orchestrator in these cases then encapsulates the processed data message and directs the SFE to send this data message to the service node associated with the next service operation in the SFP list.

Also, for each data message flow, the ingress service orchestrator in some embodiments performs a load balancing operation to convert each VIP address that specifies a service operation in a matching service rule (i.e., a rule that matches the flow's identifiers and/or contextual metadata) in the rule storage 1040 to a DIP address of a specific service machine. The ingress service orchestrator does this so that it can embed DIP addresses of actual service machines in the tunnel header, instead of VIP addresses of service machine clusters. Rather than doing this load balancing itself, the service orchestrator uses the load balancing engine 1026 in some embodiments. Alternatively, in other embodiments, the service orchestrator embeds one or more VIP address, and one of the service machines in the SFP list (e.g., the first service machine) is a load balancer that converts each VIP address to a DIP address.

When the service orchestrator is performing the operations of a non-ingress service node, the service orchestrator performs the operations of the process 900 of FIG. 9 in some embodiments. For instance, it determines that a tunnel encapsulated data message has an SFP list that identifies an IP address of an SVM or service engine associated with the orchestrator as the address of the next service machine. It decapsulates the Geneve tunnel header from a data message that is received along a Geneve tunnel, or directs another one of the service engines 1030 to perform this decapsulation. The service orchestrator 1022 then stores the decapsulated tunnel information in the tunnel data storage 1075 for later re-use.

Once the received data message has been decapsulated and its tunnel information has been stored, the service orchestrator passes the data message, and in some cases, its metadata, to its associated SVM 1032 or service engine 1030 on its host 1000 to perform the next service operation. If multiple SVMs or service engines have to process the data message, the service orchestrator sequentially passes the data message to each of its associated service machines that have to sequentially process the message. Each time the service orchestrator passes the data message to a service machine, it removes that machine's IP address from the SFP list or adjusts the service index, as mentioned above.

From one or more of its service machines, the service orchestrator can get metadata. Based on this metadata, the service orchestrator can perform re-classification operations to re-specify the SFP list in some embodiments. After having its associated service machine(s) process the data message, the service orchestrator determines whether the SFP list is empty. If so, it provides the data message to one of the GVMs on its host 1000 when the data message's destination is one of these GVMs. When the data message's destination is not a GVM on its host computer, the service orchestrator encapsulates the data message with a tunnel header (e.g., a Geneve tunnel header) and then provides the encapsulated data message to the SFE to send to its destination along a tunnel.

On the other hand, after processing a data message, and determining that the SFP list is not empty, the service orchestrator encapsulates the data message with a Geneve tunnel header, in which it embeds the modified SFP list and service index along with other tunnel attributes (e.g., metadata, etc.). As described above, and further described below by reference to FIG. 13, the service orchestrator in some embodiments can embed in the NSH metadata option TLV of the Geneve tunnel header metadata that was captured or generated by the orchestrator's associated service machine as this machine was processing the data message. The service orchestrator provides the encapsulated data message to the SFE to send along a Geneve tunnel to the service node of the next service machine identified in the SFP list.

Figure 11:
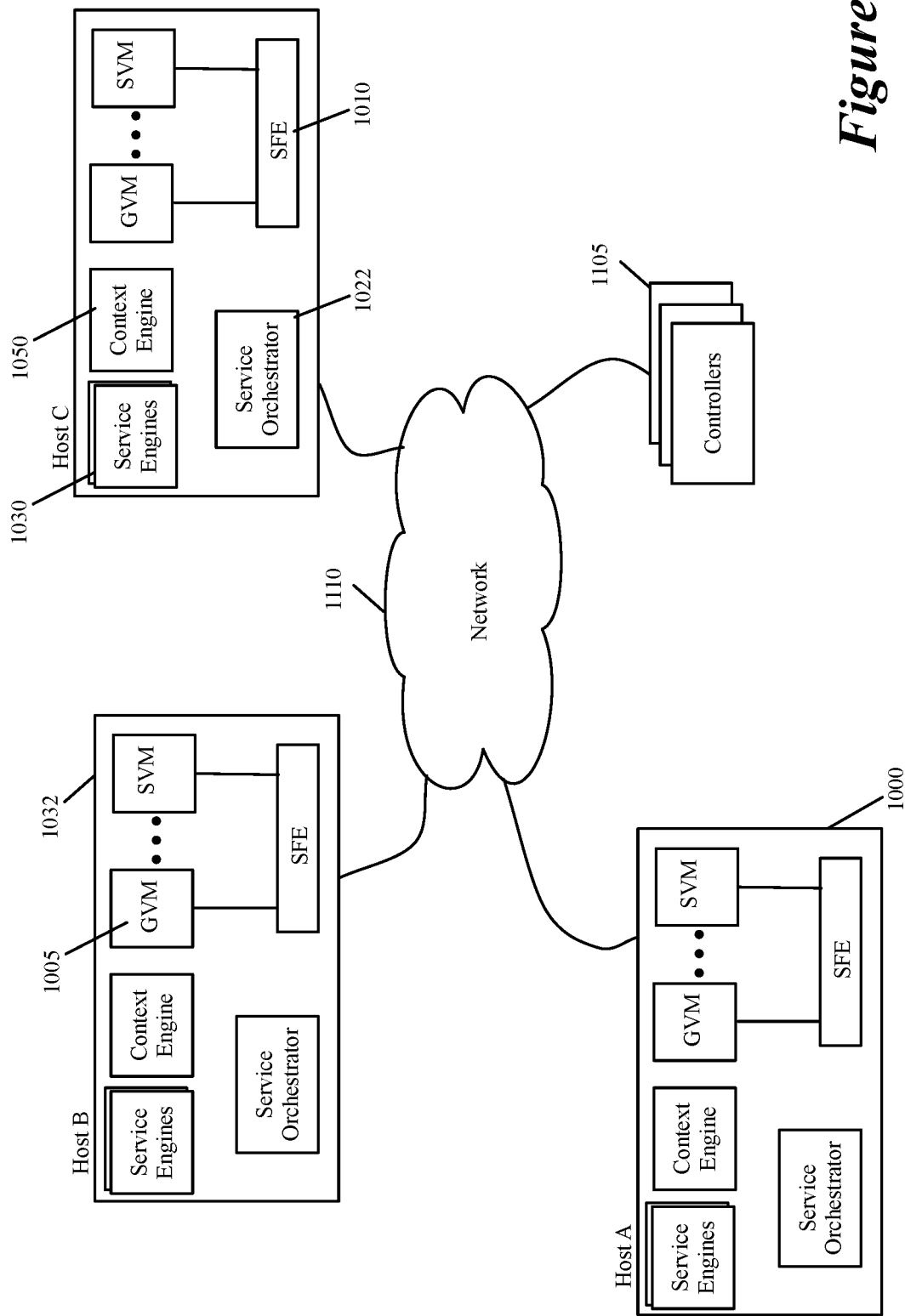
FIG. 11 illustrates an example of how the service nodes are managed in some embodiments.

FIG. 11 illustrates an example of how the service orchestrators 1022 are managed in some embodiments. This figure illustrates multiple hosts 1000 in a datacenter. As shown, each host includes several service engines 1030, a context engine 1050, a service orchestrator 1022, several GVMs 1005, one or more SVMs 1032 and an SFE 1010.

It also illustrates a set of controllers 1105 for managing the service orchestrators 1022 and the service engines 1030, GVMs 1005, and SFEs 1010. The hosts and controllers communicatively connect to each other through a network 1110, which can be a local area network, a wide area network, a network of networks (such as the Internet), etc. The controller set provides a user interface for the administrators to define context-based service rules in terms of contextual attributes, and communicates with the hosts through the network 1110 to provide these policies.

In some embodiments, the context engines 1050 collect contextual attributes that are passed to the management servers in the controller set through a network 1110 so that these contextual attributes can be used to define policies. The management servers in some embodiments interact with the discovery engines executing on the host computers 1000 in the datacenter to obtain and refresh inventory of all processes and services that are running on the GVMs on the hosts. The management plane in some embodiments then provides a rule creation interface for allowing administrators to create context-based service rules for the service engines, SVMs and the orchestrating engines 1022.

Once the high-level service policies are defined in the management plane, the management plane directly supplies some or all of these policies to the management proxies (not shown) on the hosts 1000, and/or indirectly supplies some or all of these policies to these proxies through a set of configuring controllers. In some embodiments, the management proxies publish the received policies as rules to the context-based service rule storages 1043. In some embodiments, the proxies transform these policies before publishing them to the context-based service rule storages 1043. Also, the context engines 1050 on the hosts 1000 in some embodiments resolve the policies based on collected contextual attributes, in order to generate rules for the service engines.

In some embodiments, different policies are specified for different data message flows from a source GVM based on different traffic content carried by these flows. For instance, one policy might define an SFP list that use low-latency service engines for a data message flow from a source GVM that is for a video conference involving the executive staff of a corporation, while another policy might define an SFP list that uses service engines with higher latency for a data message flow from the same GVM when this message flow pertains to an email being sent.

Figure 12:
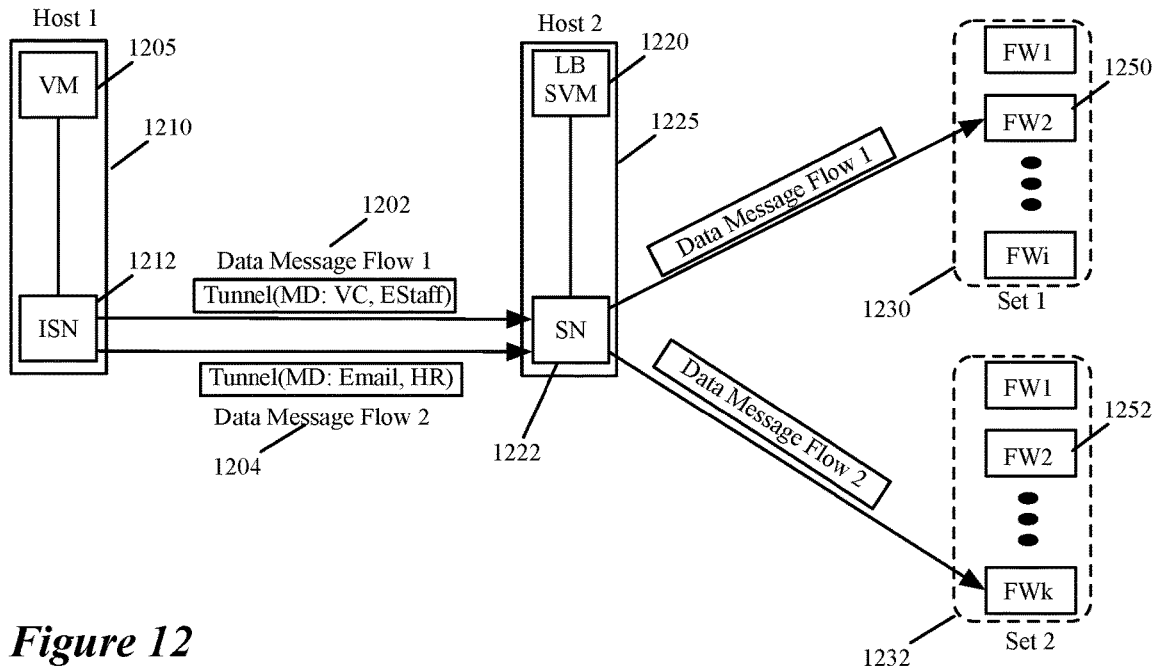
FIGS. 12 and 13 illustrate examples for forwarding and processing metadata in connection with service operations that are performed by service machines in some embodiments.
Figure 13:
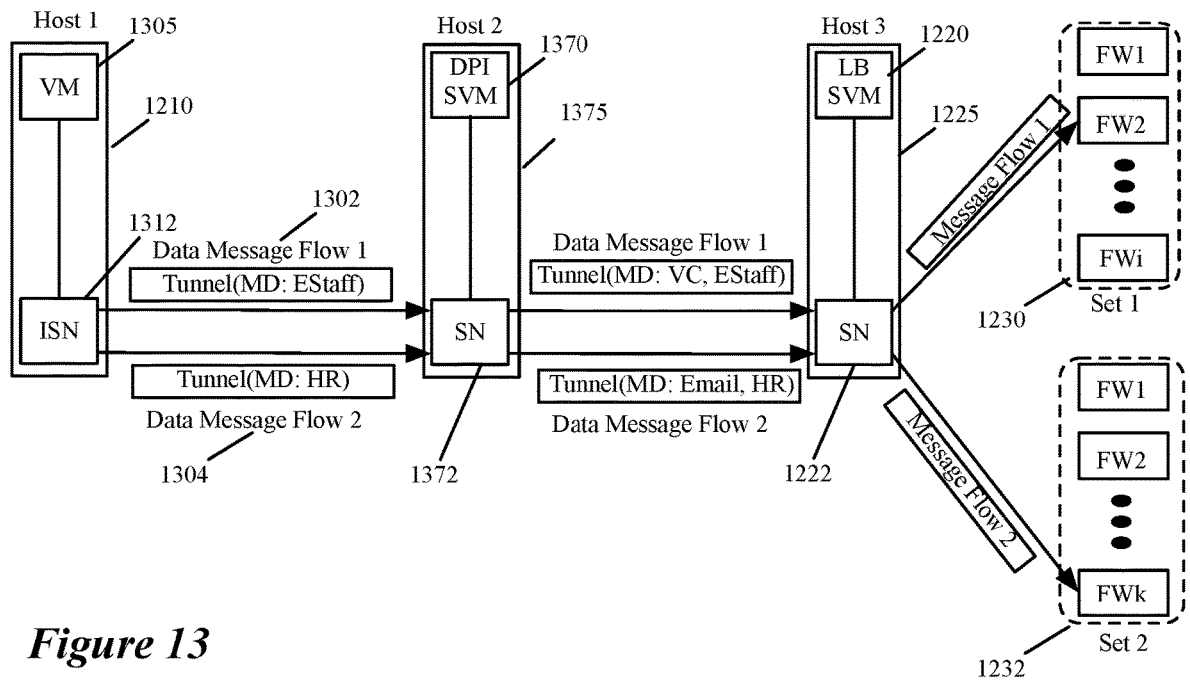

FIGS. 12 and 13 illustrate two examples for forwarding and processing metadata in connection with service operations that are performed by service machines in some embodiments. The example illustrated in FIG. 12 shows the processing of two message flows 1202 and 1204 that emanate from one VM 1205 on a host 1210 at two different times. Both these message flows need to be processed by firewall service machines, and are directed to one firewall machine in one of two firewall service clusters 1230 and 1232 by a load balancing SVM 1220 executing on another host 1225.

The ingress service node 1212 of the first host 1210 encapsulates the data messages for both of these flows with a tunnel header that includes contextual metadata about the data message flow. The contextual metadata for the first flow 1202 specifies that this flow carries video conference data for someone on the executive staff (Estaff) of the company, while the contextual metadata for the second flow 1204 specifies that this flow carries email data for someone in Human Resource (HR) Department. The HR and Estaff information is expressed in terms of active directory group identifiers in some embodiments. Also, in some embodiments, the ingress service node 1212 stores the contextual metadata in each data message of each flow, while in other embodiments the ingress service node stores the contextual metadata only in a subset of the data messages (e.g., the first message, or the first N messages, or every 100 messages) of each flow.

The service node 1222 of the host 1225 decapsulates each encapsulated data message, and provides to the load balancing SVM 1220 the decapsulated data message along with the embedded contextual metadata attributes, which indicate the traffic type and active directory group identifier. Based on the contextual metadata attributes, the load balancer 1220 determines that the first data message flow has to be directed to the low-latency firewall service cluster 1230, while the second data message flow 1204 can be directed to the regular firewall service cluster 1232.

For each message flow, the load balancer 1220 also selects one firewall service machine 1250 or 1252 in each service cluster 1230 or 1232, and provides the selected firewall service machine's identifier (e.g., its IP address) to the service node 1222. Based on the provided service machine identifiers, the service node 1222 then forwards each data message flow to the firewall machines 1250 or 1252 that the load balancer 1220 selected for each flow.

FIG. 13 illustrates a similar example to that of FIG. 12, except that in FIG. 13, the ingress service node 1312 does not identify the traffic type but rather leaves the traffic-type identification to a DPI service module 1370 that executes on a host computer 1375 along with the first service node 1372. In some embodiments, the DPI service module 1370 identifies the traffic type by examining the first data message or first few data messages in each flow using standard DPI techniques.

After identifying the traffic type, the DPI module generates a traffic-type identifier, and provides this generated metadata to the first service node 1372. After receiving this metadata for a data message, the first service node 1372 then re-encapsulates the data message with a tunnel header that includes both the active-directory metadata received from the ingress service node 1312 and the traffic type metadata generated by the DPI module 1370. The first service node 1372 then forwards each encapsulated data message of each flow to the service node 1222 of the host 1225. The service node 1222 in FIG. 13 then processes each data message flow in the same way as the service node 1222 of FIG. 12.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
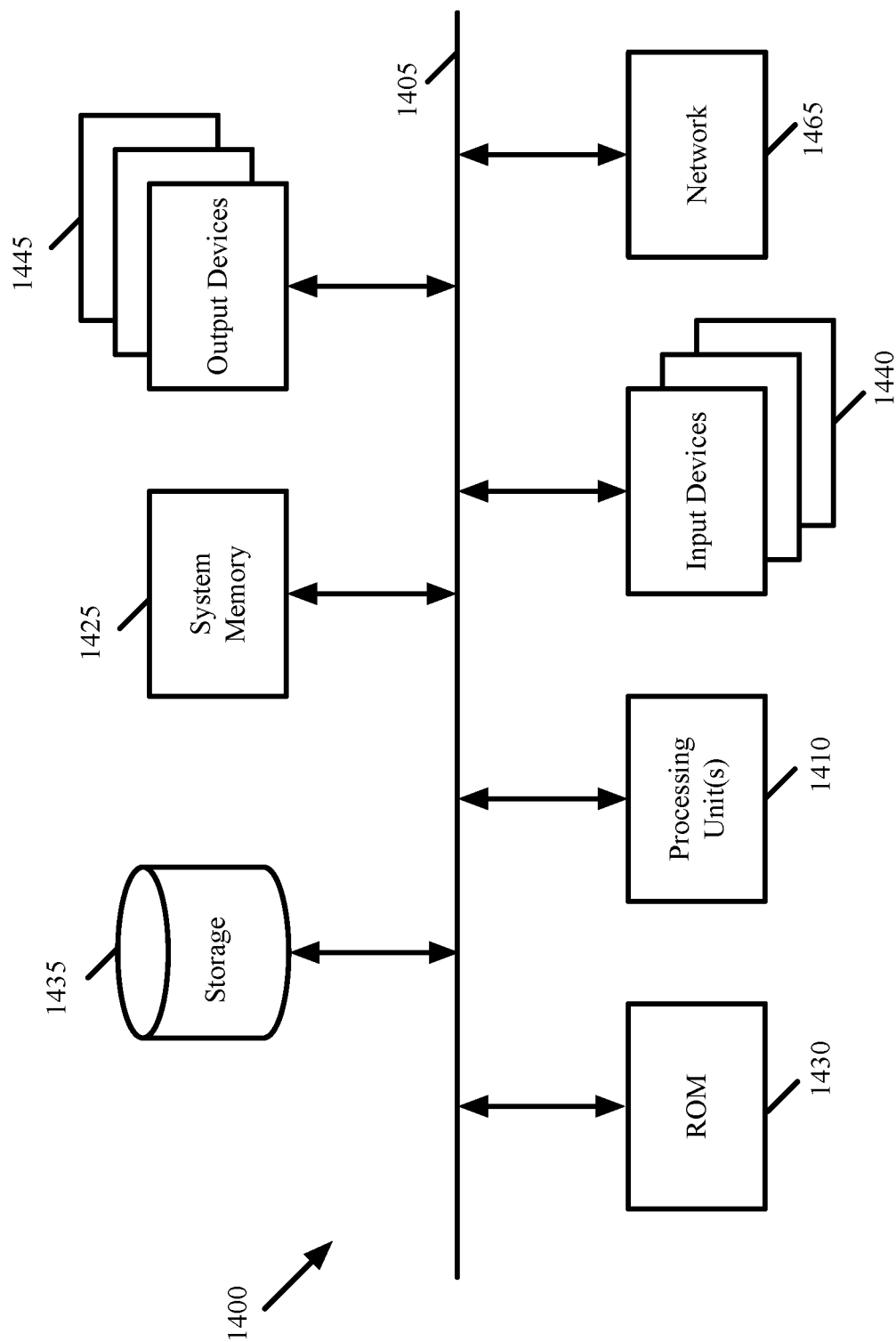
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, and managers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The above-described methodology is used in some embodiments to express service chains in single tenant environments. Thus, one of ordinary skill will realize that some embodiments of the invention are equally applicable to single tenant datacenters. Conversely, in some embodiments, the above-described methodology is used to carry service chain specification across different datacenters of different datacenter providers when one entity (e.g., one corporation) is a tenant in multiple different datacenters of different providers. In these embodiments, the tenant identifiers that are embedded in the tunnel headers have to be unique across the datacenters, or have to be translated when they traverse from one datacenter to the next. Thus, one of ordinary skill in the art would understand that the invention is not to be limited by the foregoing illustrative details, but rather is to be defined by the appended claims

We claim:

1. A method of specifying service operations for a data message associated with a particular machine executing on a host computer, the method comprising:

at the host computer:
storing, in a tunnel header for encapsulating a data message, a plurality of service identifiers associated with a plurality of service machines for performing a plurality of service operations on the data message, the plurality of service identifiers stored in a variable sized option field of the tunnel header that allows different number of service machines to be specified for performing different number of service operations for different data message flows;

forwarding the data message encapsulated with the tunnel header along a tunnel to a first service machine to perform a first service operation identified by the plurality of service identifiers; and storing in the tunnel header a tenant identifier identifying a particular tenant associated with the particular machine;

wherein the method is implemented in a multi-tenant datacenter, the tunnel header is a Geneve tunnel header, the tenant identifier is stored in a Geneve base header, and the plurality of service identifiers stored in the variable sized option field comprises the plurality of service identifiers stored in an option TLV (Type, Length, Value) of the Geneve header.

2. The method of claim 1, wherein storing the plurality of service identifiers comprises storing in the tunnel header a plurality of network addresses of the plurality of service machines.

3. The method of claim 2, wherein storing the plurality of service identifiers further comprises storing in the tunnel header a service operation descriptor for each service machine identified by a network address stored in the tunnel header, in order to explain the type of service operation that the service machine performs.

4. The method of claim 1, wherein
the service identifiers are stored in a reverse order in the tunnel header such that the first service operation is stored last while the last service operation is stored first.

5. The method of claim 1 further comprising storing a service index value in the tunnel header that identifies one of the stored service identifiers as a next service operation that is to be performed.

6. The method of claim 1 further comprising based on a set of one or more attributes associated with the data message, selecting a set of at least two service operations from a plurality of candidate sets of service operations that are different viable operation sets for performing on the data message.

7. The method of claim 6, wherein selecting comprises:
for a first data message flow from a first machine to a second machine, selecting a first set of service operations based on a first type of content carried in the first data message flow; and
for a second data message flow from the first machine to the second machine, selecting a second set of service operations based on a second type of content carried in the second data message flow, said second set of service operations comprising at least one service operation not in the first set of service operations.

8. The method of claim 1, wherein the tunnel connects to a first service node that connects to the first service machine without having to utilize any intervening hardware router or hardware switch.

9. The method of claim 8, wherein the first service machine is one of a standalone computer, a service module executing on a host computer, and a standalone service appliance.

10. The method of claim 8, wherein the first service node and first service machine are modules executing on a host computer along with other machines.

11. The method of claim 8, wherein the first service node removes the tunnel header, provides the data message to the first service machine, receives the processed data message from the first service machine, encapsulates the processed data message with another tunnel header generated from information obtained from the removed tunnel header, and sends the encapsulated processed data message along another tunnel to another service node that is connected to a second service machine to perform a first service operation identified by the plurality of service identifiers.

12. The method of claim 1, wherein the service operations are middlebox service operations.

13. A non-transitory machine readable medium storing a program for execution by at least one processing unit of a host computer, the program specifying service operations for a data message associated with a particular machine executing on the host computer, the program comprising sets of instructions for:

storing, in a tunnel header for encapsulating a data message, a plurality of service identifiers associated with a plurality of service machines for performing a plurality of service operations on the data message, the plurality of service identifiers stored in a variable sized option field of the tunnel header that allows different number of service machines to be specified for performing different number of service operations for different data message flows; and forwarding the data message encapsulated with the tunnel header along a tunnel to a first service machine to perform a first service operation identified by the plurality of service identifiers;

wherein the program is implemented in a multi-tenant datacenter, the program further comprising a set of instructions for storing in the tunnel header a tenant identifier identifying a particular tenant associated with the particular machine, the tunnel header is a Geneve tunnel header, the tenant identifier is stored in a Geneve base header, and the plurality of service identifiers stored in the variable sized option field comprises the plurality of service identifiers stored in an option TLV (Type, Length, Value) of the Geneve header.

14. The non-transitory machine readable medium of claim 13, wherein the set of instructions for storing the plurality of service identifiers comprises a set of instructions for storing in the tunnel header a plurality of network addresses of the plurality of service machines.

15. The non-transitory machine readable medium of claim 14, wherein the set of instructions for storing the plurality of service identifiers further comprises a set of instructions for storing in the tunnel header a service operation descriptor for each service machine identified by a network address stored in the tunnel header, in order to explain the type of service operation that the service machine performs.

16. The non-transitory machine readable medium of claim 13, wherein
the service identifiers are stored in a reverse order in the tunnel header such that the first service operation is stored last while the last service operation is stored first.

* * * * *